A. H. WOODWARD.
FARE REGISTER.
APPLICATION FILED DEC. 30, 1915.
1,310,819.
Patented July 22, 1919.
20 SHEETS—SHEET 1.
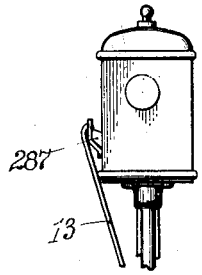
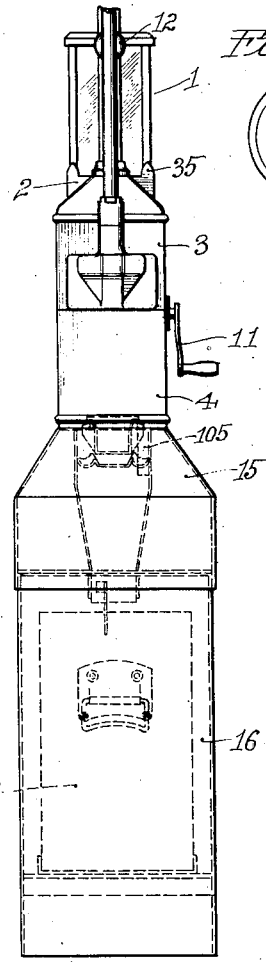
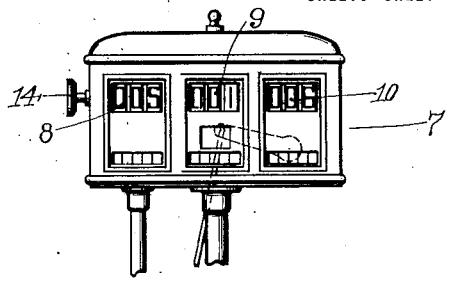
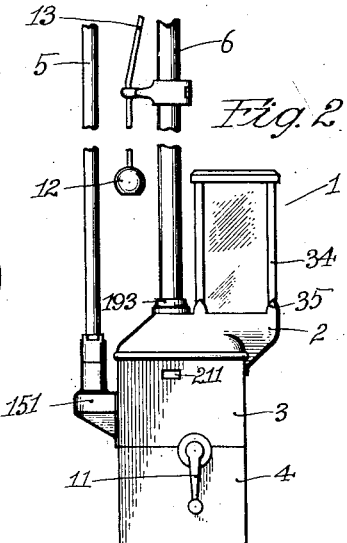
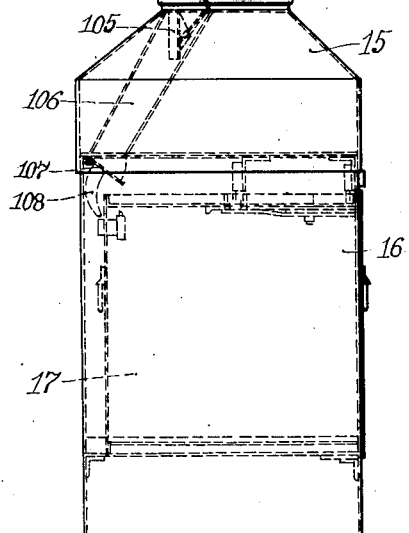
Fig. 1
Fig. 2
Fig. 3
Inventor
Arthur H. Woodward
By Brown, Hanson & Boettcher
Attorneys.

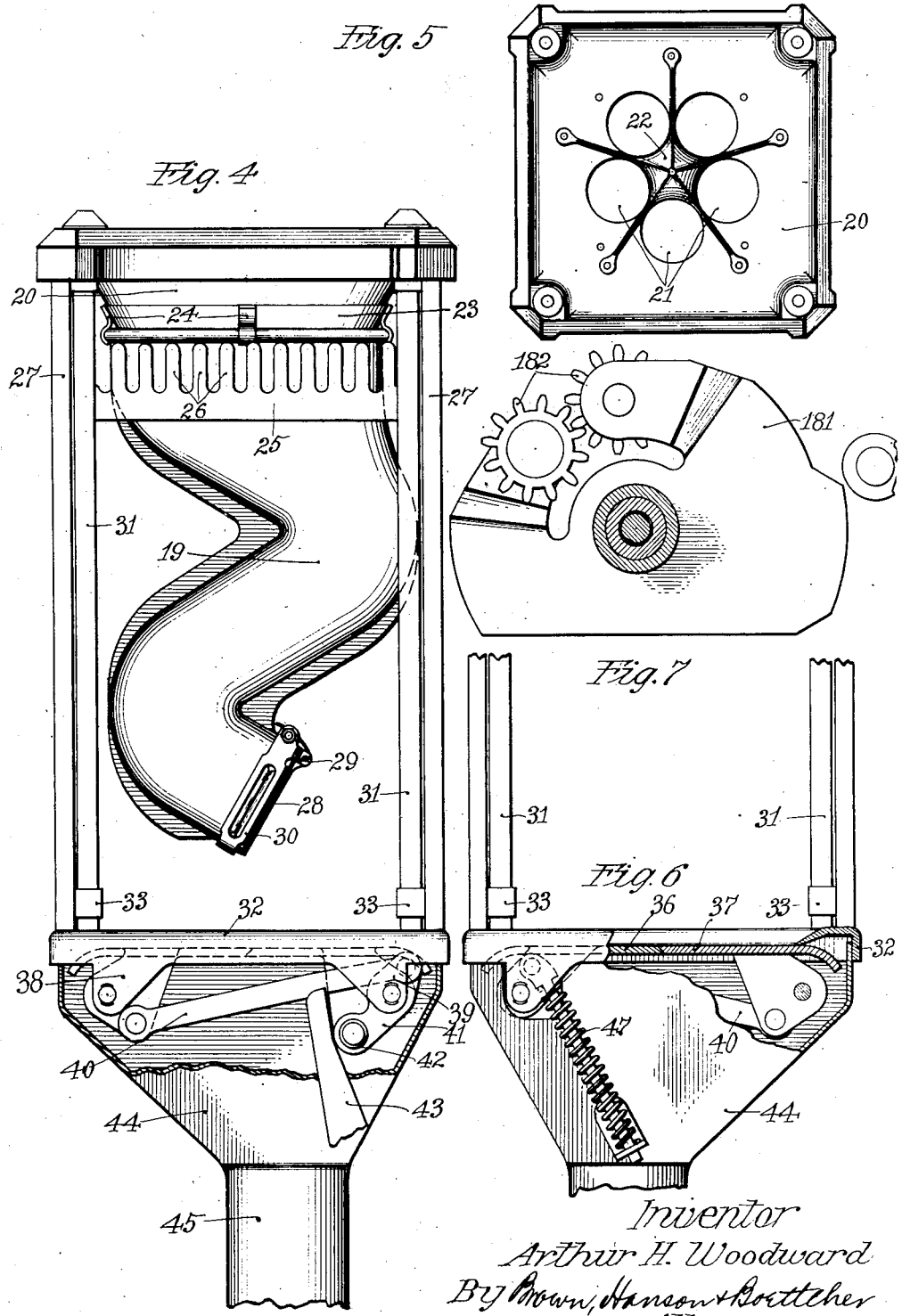

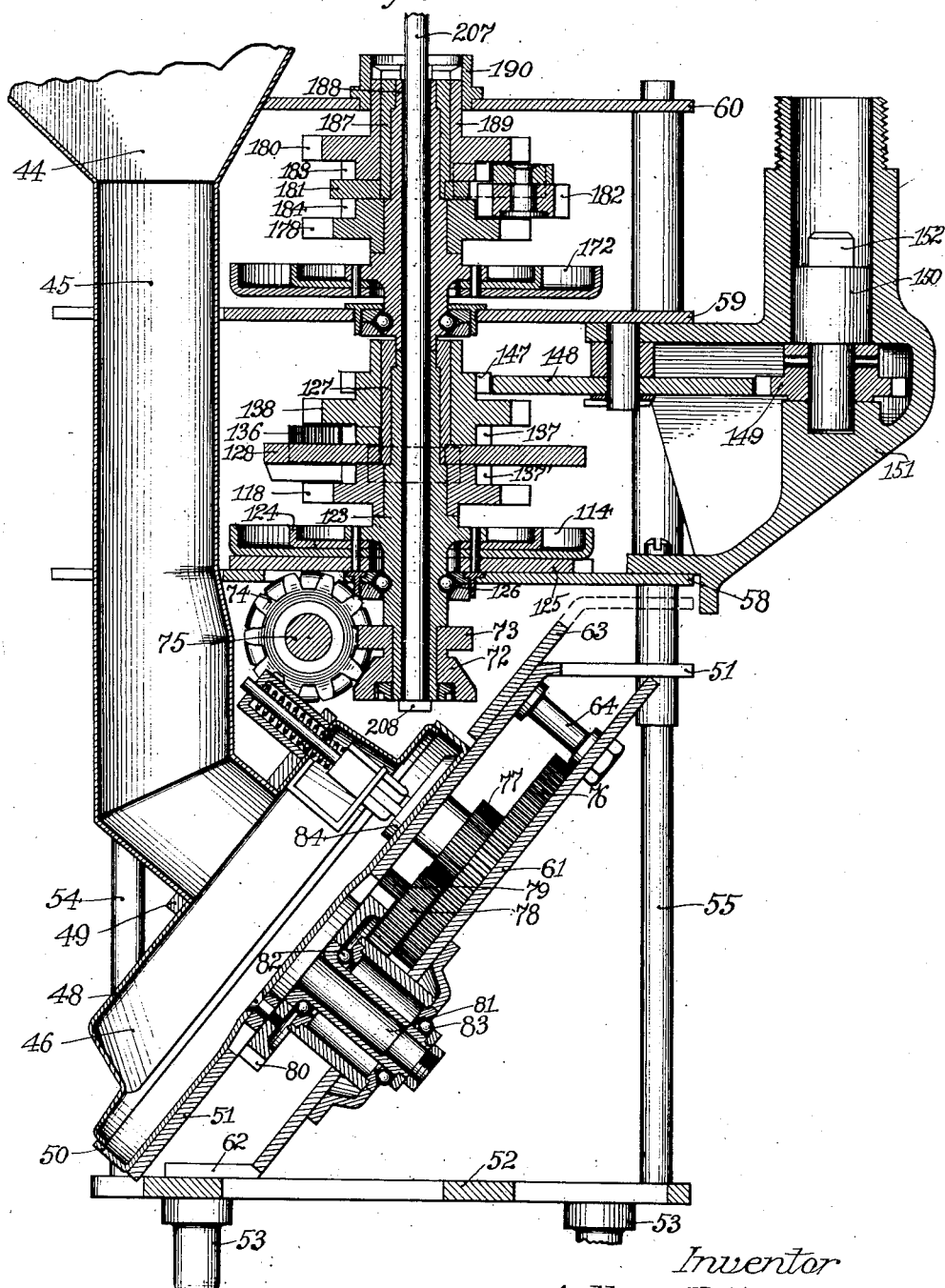

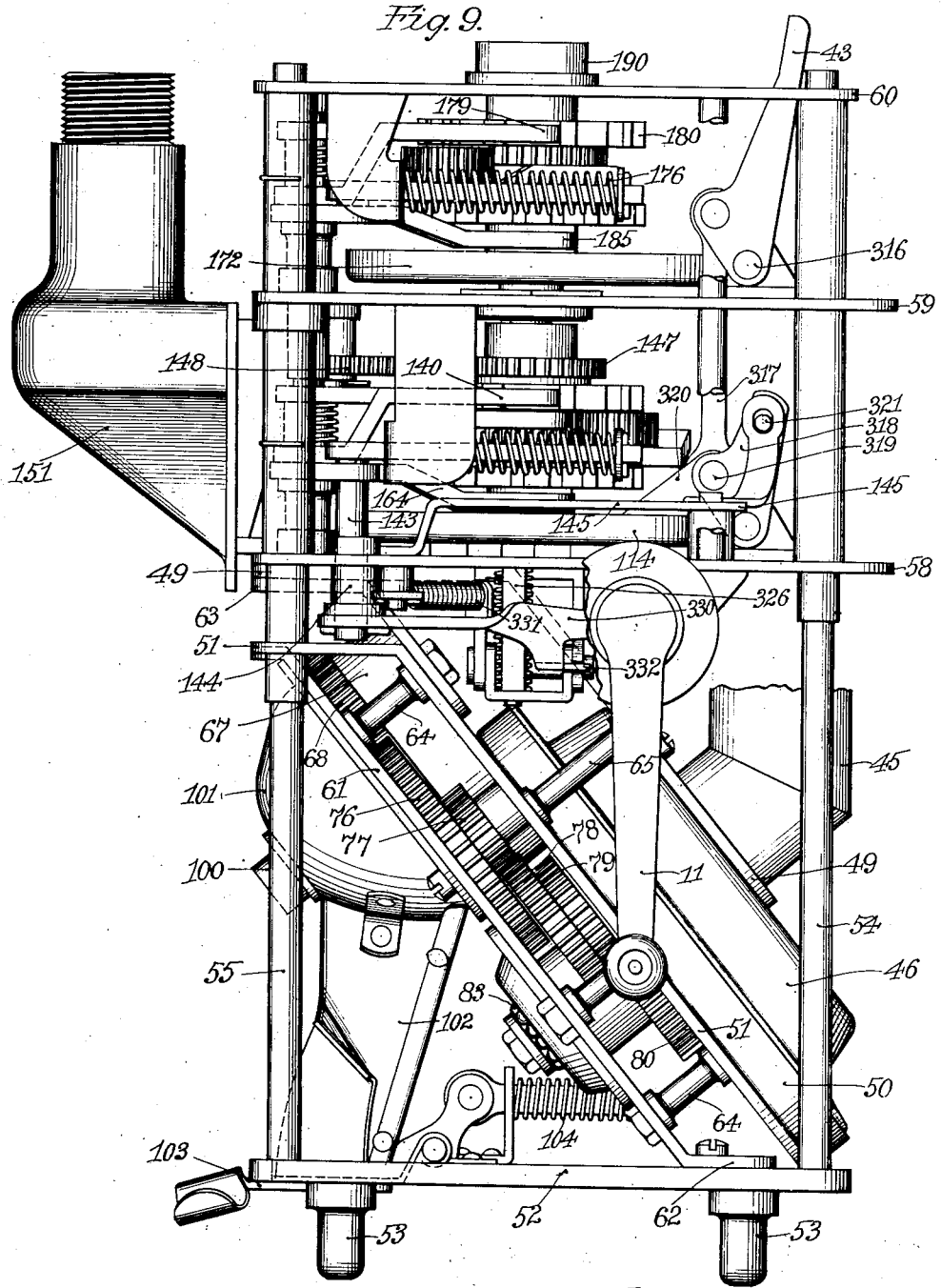

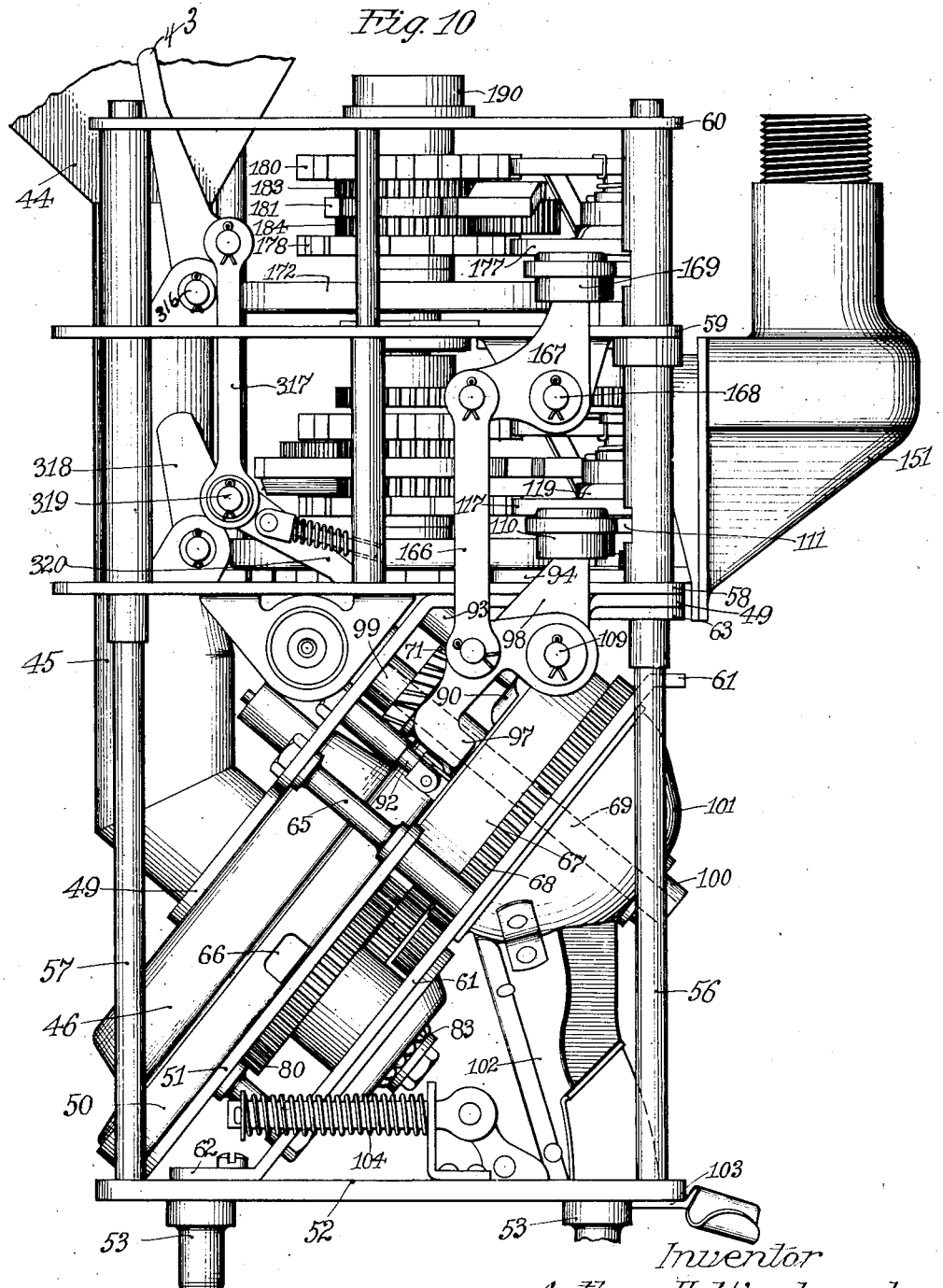

A. H. WOODWARD.
FARE REGISTER.
APPLICATION FILED DEC. 30, 1915.

1,310,819.

Patented July 22, 1919.
20 SHEETS—SHEET 6.

Inventor
Arthur H. Woodward
By Brown, Hanson & Boettcher
Attorneys

A. H. WOODWARD.
FARE REGISTER.
APPLICATION FILED DEC. 30, 1915.

1,310,819.

Patented July 22, 1919.
20 SHEETS—SHEET 7.

Inventor
Arthur H. Woodward
By Brown, Hanson & Boettcher
Attorneys.

A. H. WOODWARD.
FARE REGISTER.
APPLICATION FILED DEC. 30, 1915.

1,310,819.

Patented July 22, 1919.
20 SHEETS—SHEET 8.

Inventor
Arthur H. Woodward
By Brown, Hanson & Boettcher
Attorneys.

A. H. WOODWARD.
FARE REGISTER.
APPLICATION FILED DEC. 30, 1915.

1,310,819.

Patented July 22, 1919.
20 SHEETS—SHEET 9.

Inventor
Arthur H. Woodward
By Brown, Hanson & Boettcher
Attorneys.

Inventor
Arthur H. Woodward
By Brown, Hanson & Boettcher
Attorneys.

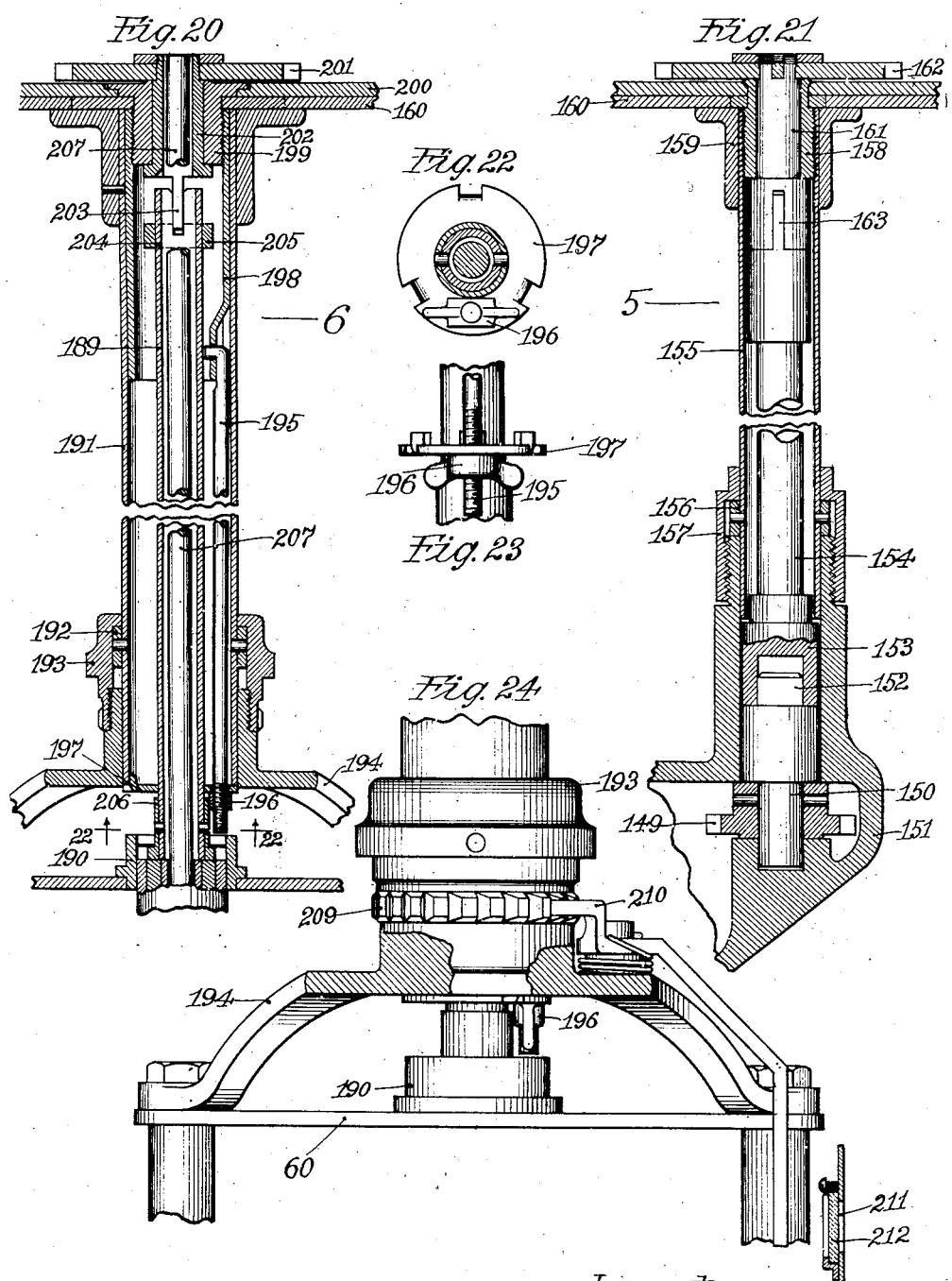

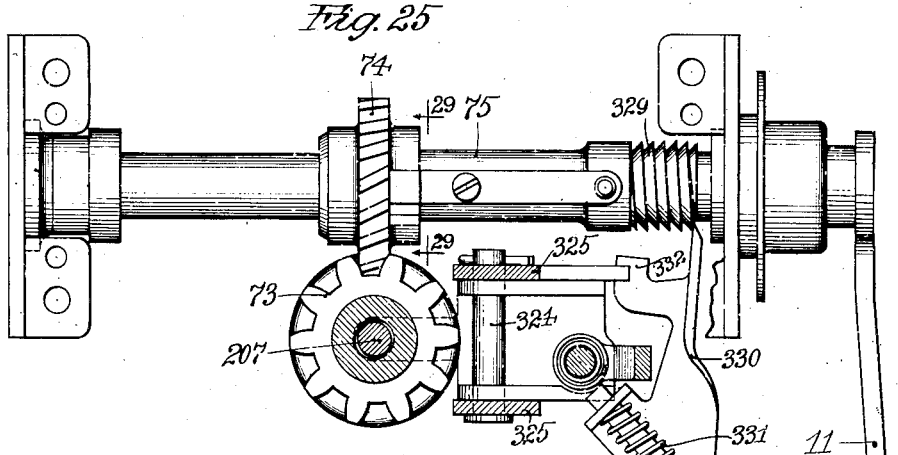
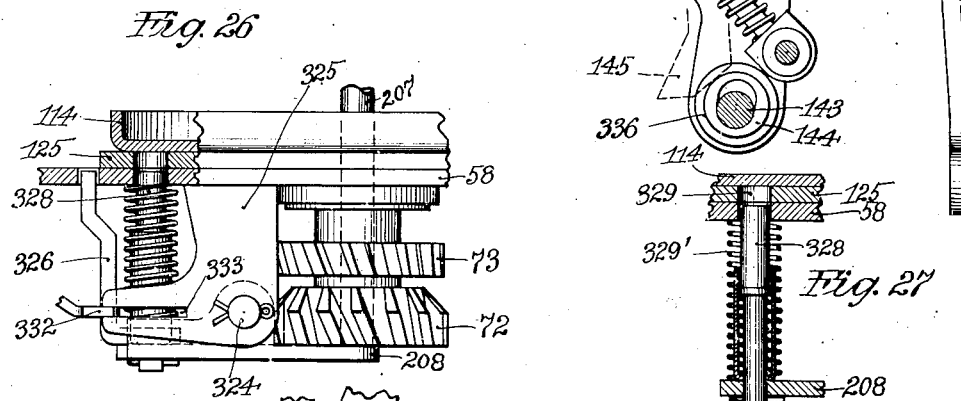
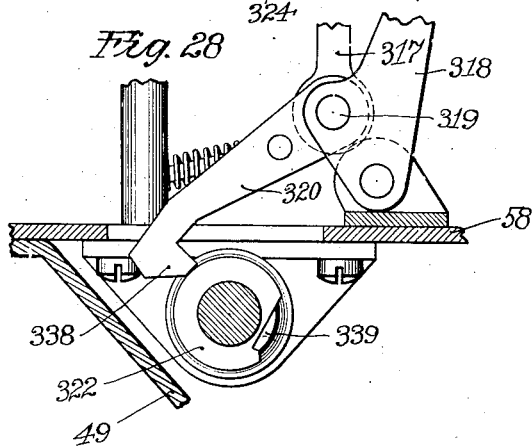
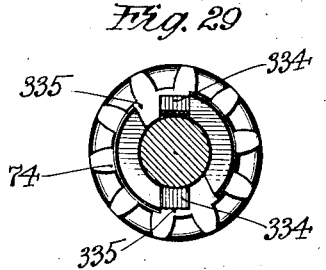

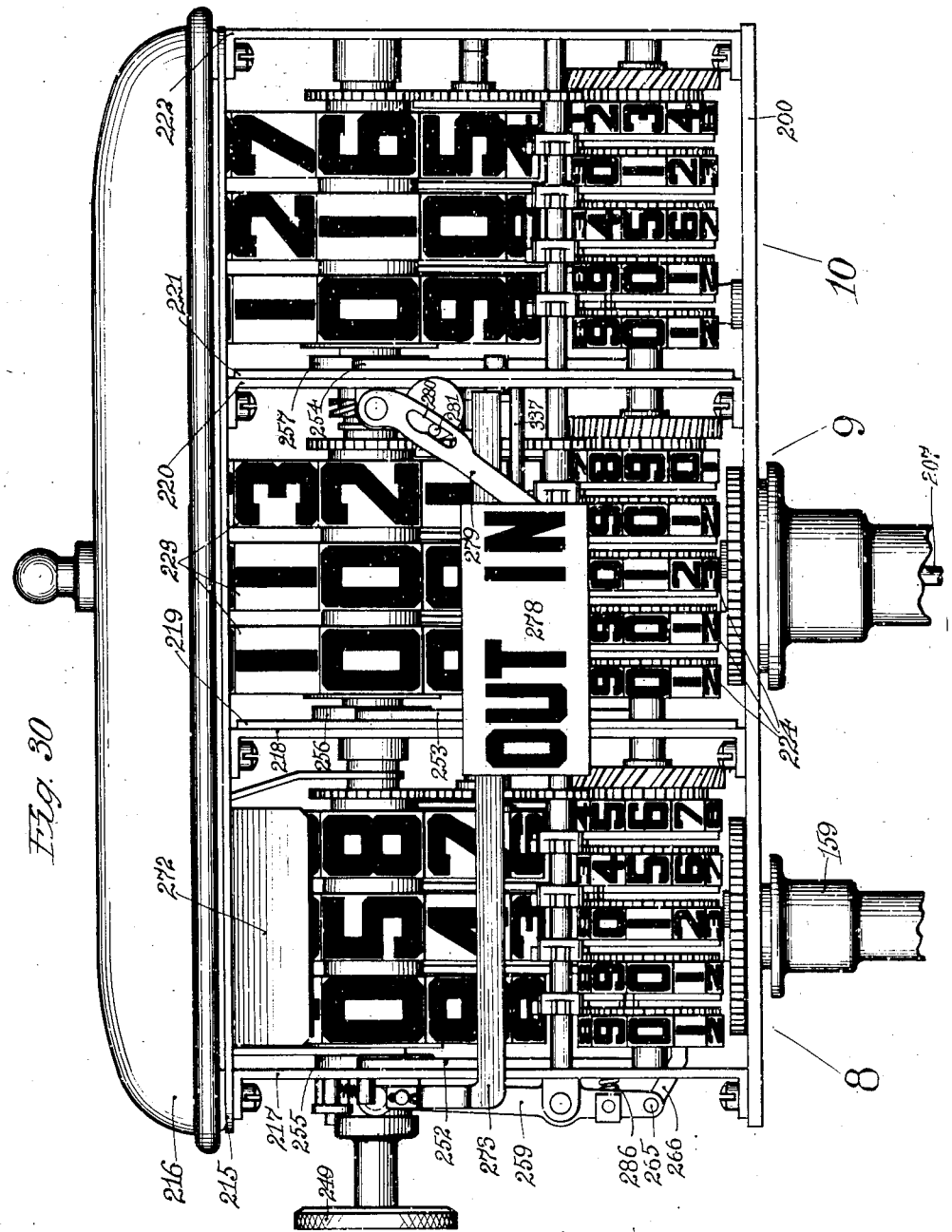

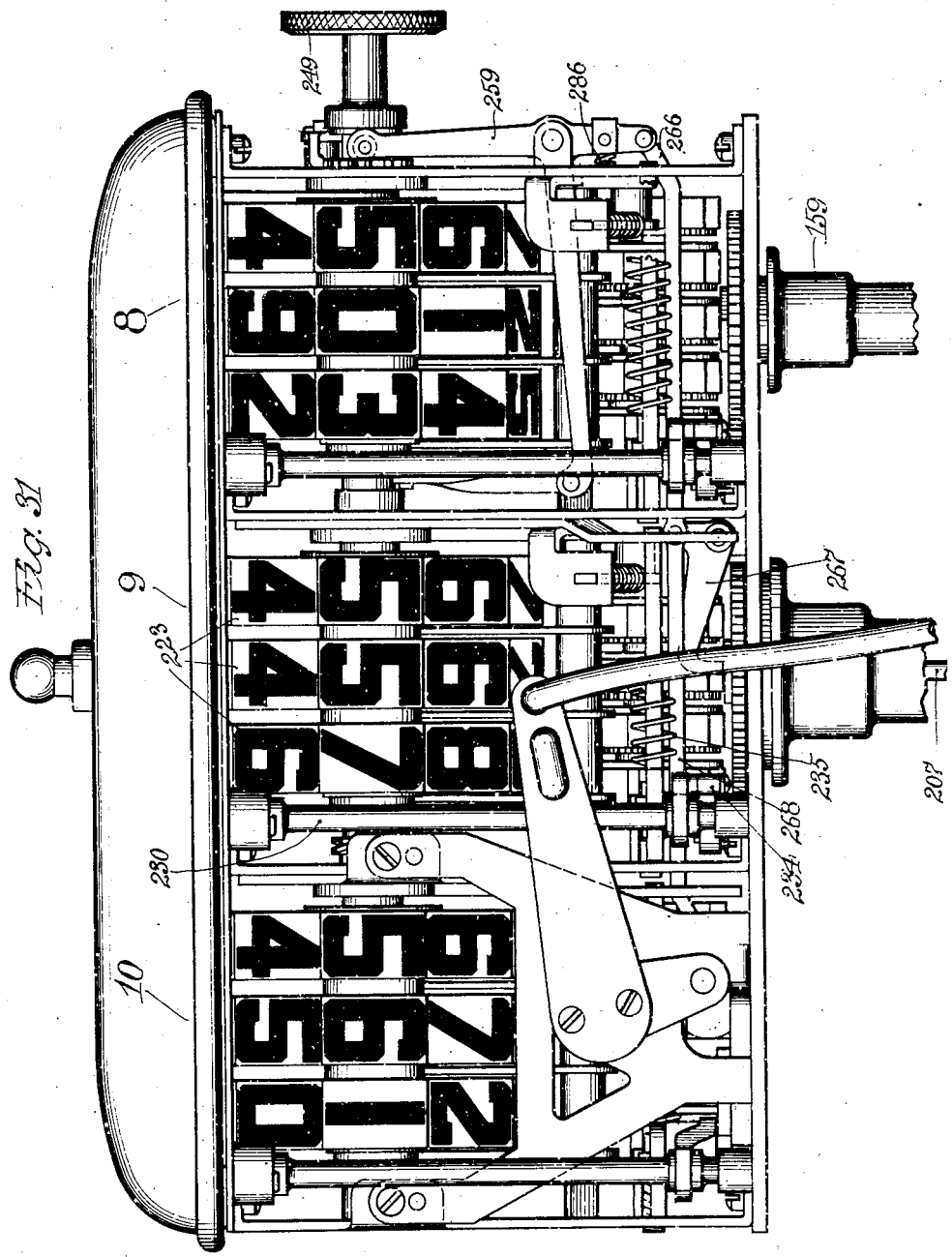

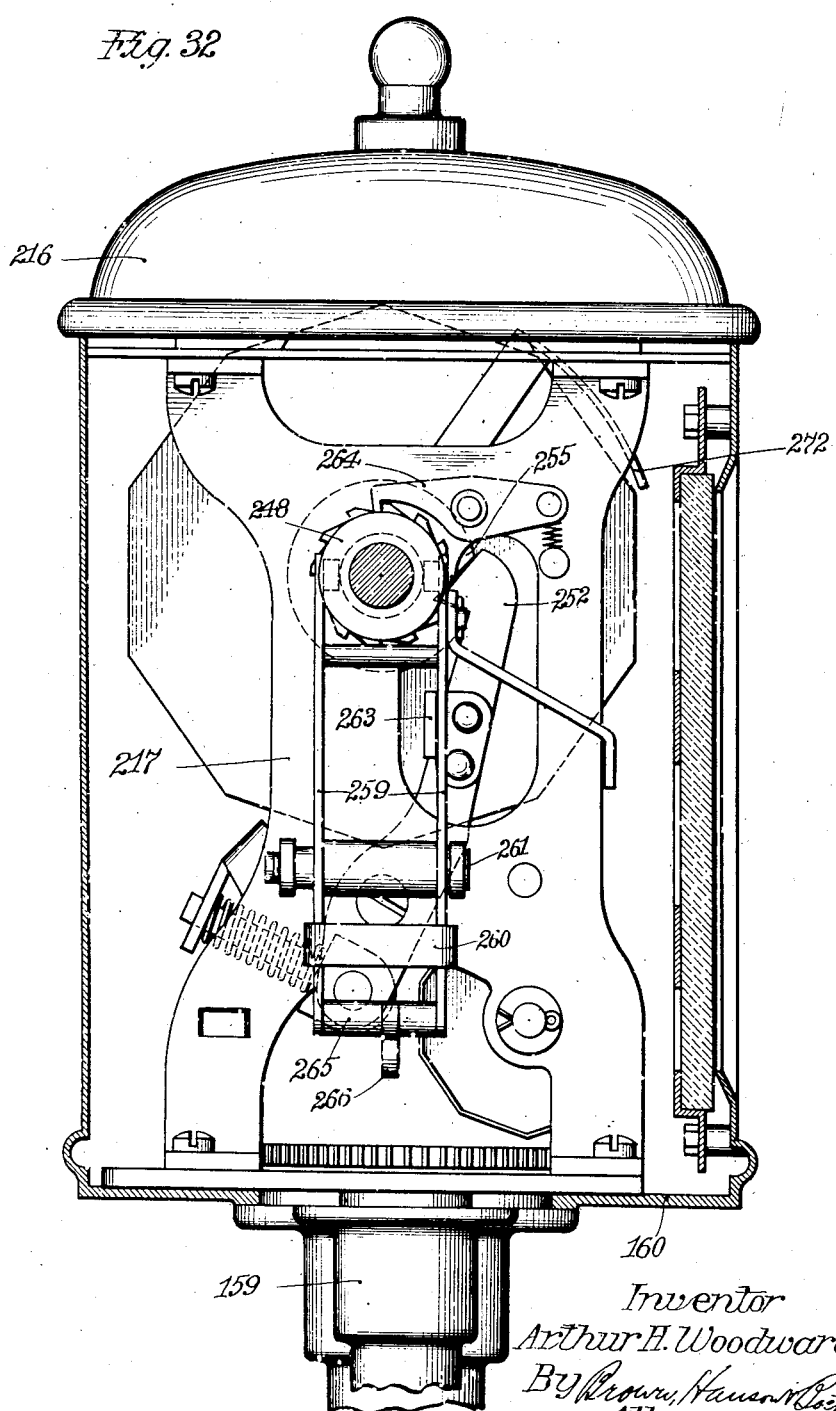

A. H. WOODWARD.
FARE REGISTER.
APPLICATION FILED DEC. 30, 1915.
1,310,819.
Patented July 22, 1919.
20 SHEETS—SHEET 16.
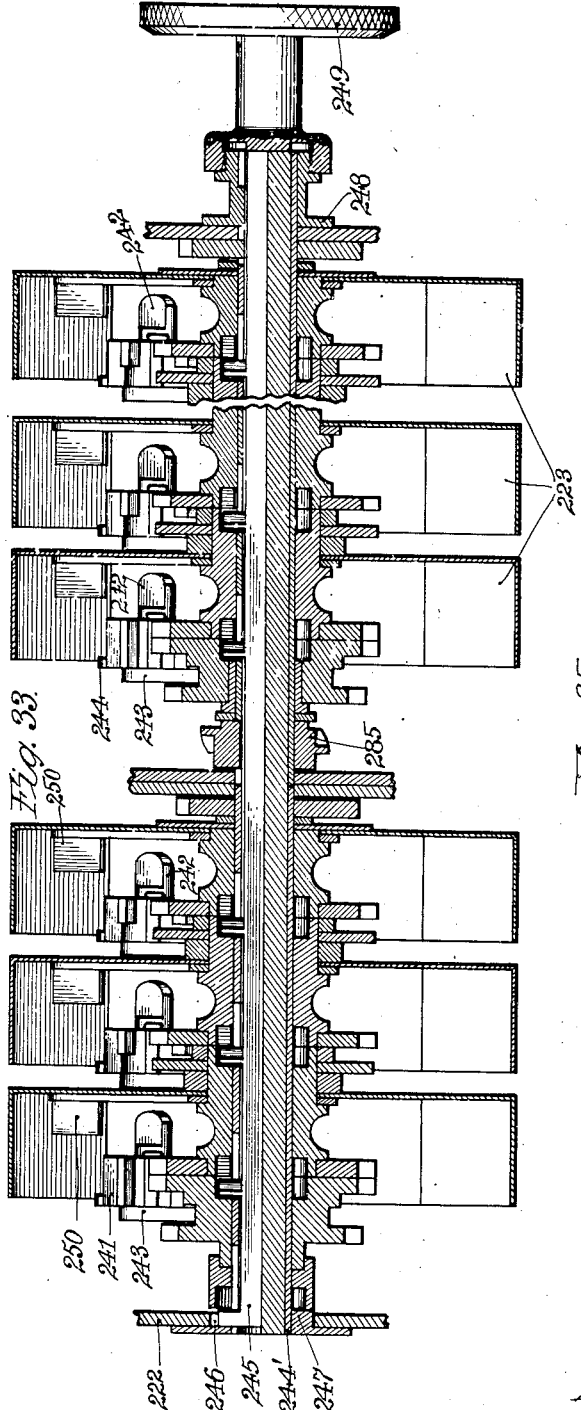
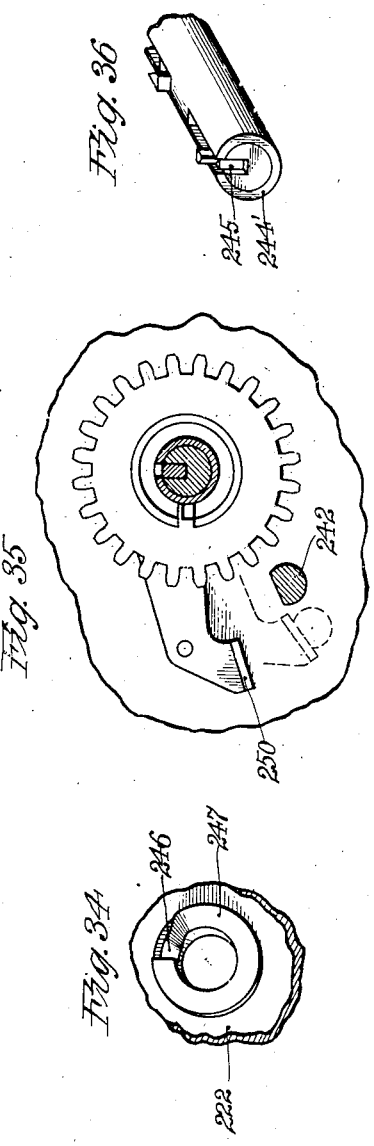
Inventor
Arthur H. Woodward
By Brown, Hanson & Boettcher
Attorneys

A. H. WOODWARD.
FARE REGISTER.
APPLICATION FILED DEC. 30, 1915.

1,310,819.

Patented July 22, 1919.
20 SHEETS—SHEET 17.

Inventor
Arthur H. Woodward
By Brown, Hanson & Boettcher
Attorneys.

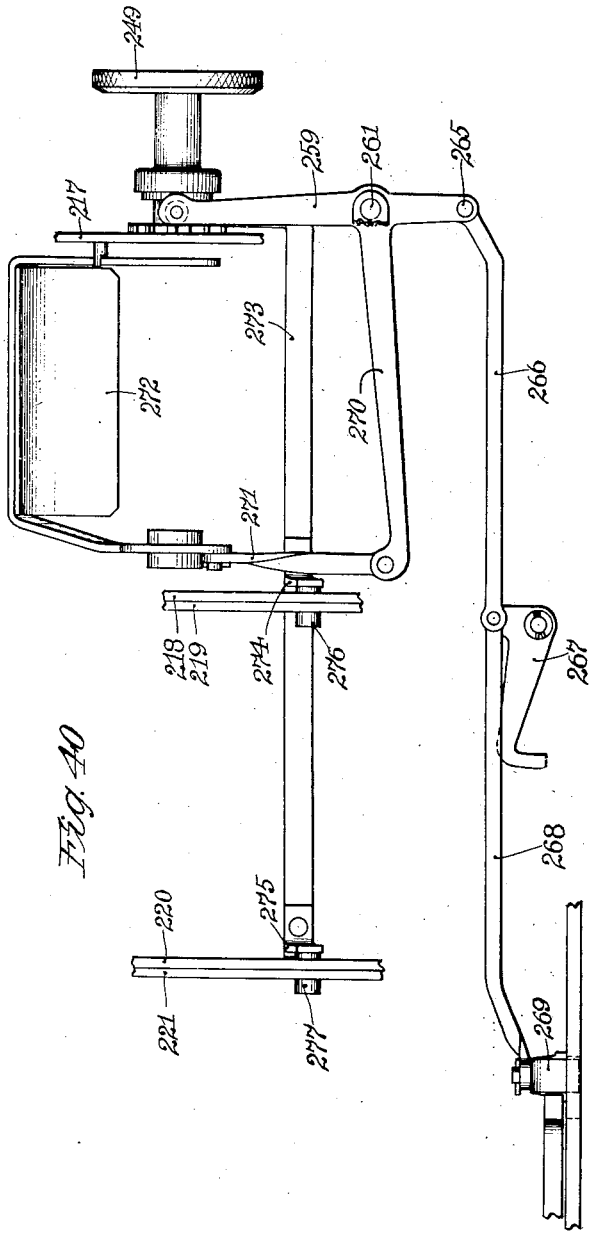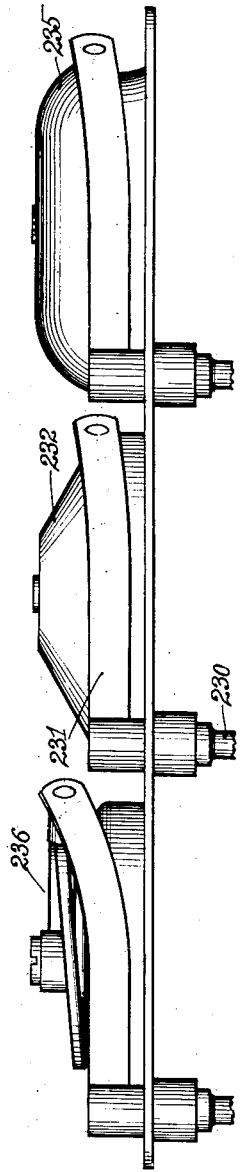

A. H. WOODWARD.
FARE REGISTER.
APPLICATION FILED DEC. 30, 1915.

1,310,819.

Patented July 22, 1919.
20 SHEETS—SHEET 20.

Inventor
Arthur H. Woodward
By Brown, Harrison & Boettcher
Attorneys.

UNITED STATES PATENT OFFICE.

ARTHUR H. WOODWARD, OF ALTADENA, CALIFORNIA, ASSIGNOR, BY MESNE ASSIGNMENTS, TO JOHNSON FARE BOX COMPANY, OF CHICAGO, ILLINOIS, A CORPORATION OF NEW YORK.

FARE-REGISTER.

1,310,819.  Specification of Letters Patent.  Patented July 22, 1919.

Application filed December 30, 1915. Serial No. 69,484.

*To all whom it may concern:*

Be it known that I, ARTHUR H. WOODWARD, a citizen of the United States, residing at Altadena, in the county of Los Angeles and State of California, have invented a certain new and useful Improvement in Fare-Registers, of which the following is a full, clear, concise, and exact description, reference being had to the accompanying drawings, forming a part of this specification.

This invention provides an improved fare register.

Many street railway companies prefer to employ tickets to reduce the inconvenience of making change. The tickets are generally sold at reduced rates, such as six tickets for a quarter of a dollar. The patrons buy the number of tickets and there is less making of change and handling of money. This is highly advantageous but where coins, tickets and transfers are taken by the conductor a chance for error and loss to the operating company arises due among other things to the increased complication. I have found that where metal checks or counters are employed as tickets, they may be sorted and counted like coins. In view of their odd monetary value it is advisable to sort and register separately these tokens, which I shall term hereafter as "tickets." I reserve the term "tokens" to include both the tickets and coins.

Where transfers are employed, it is desirable that these be registered along with the cash and ticket fares so that inspectors by glancing at the overhead register can check up the total number of people on the car.

One object of my invention is to provide a fare register which will be capable of separately registering coins, tickets and transfers. The coins and tokens are not handled by the conductor until after they are automatically separated and registered, but paper transfers are received by the conductor from the hands of passengers as there is less likelihood of loss to the operating company thereby.

Another object of the invention is to provide an overhead register which will show the trip receipt in each class of fares and will show the total receipts as well, and in which the trip registers are all re-set together.

Another object is to interlock the trip registers with the operating devices for the same so that incorrect operation or "manipulation" by the operator will be impossible.

A further object is the provision of improved register operating mechanism. Other objects will be apparent from the following description.

In the accompanying drawings which form a part of the present specification and in which I have illustrated one embodiment of my invention, Figure 1 is an elevational view taken from the side on which the operator normally stands;

Fig. 2 is a similar front elevational view;

Fig. 3 shows the type of metal tickets employed in connection with this type of apparatus;

Fig. 4 is an elevational view with parts broken away of the receiving hopper. This view is taken as from the left side of Fig. 1;

Fig. 5 is a plan view of the hopper;

Fig. 6 is a fragmentary elevation of parts of the trap-door mechanism showing a rear view of the mechanism shown at the bottom of Fig. 4;

Fig. 7 is a plan view of the knock-off cam for the ticket registering mechanism;

Fig. 8 is a vertical cross-section viewed as from the left of Fig. 1 of the coin and ticket receiving, separating and evaluating mechanism;

Fig. 9 is an elevational view of the same mechanism taken from the same side as shown in Fig. 2;

Fig. 10 is a rear elevation of the mechanism shown in Fig. 9;

Fig. 20 is a longitudinal cross-sectional view of the column containing the transmission mechanism to the ticket register;

Fig. 21 is a similar view of the column containing the transmission mechanism for the coin register;

Fig. 22 is a fragmentary cross-sectional view taken on the line 22, 22 of Fig. 20;

Fig. 23 is a fragmentary elevational view taken from the left of Fig. 20;

Fig. 24 is an enlarged fragmentary elevation of the lower part of the column shown in Fig. 20, illustrating the pawl and ratchet locking mechanism for the casing;

Fig. 25 is a fragmentary view of the main driving shaft and the interlocking mechanism connected therewith;

Fig. 26 is a fragmentary elevational view showing part of the interlocking mechanism, shown in plan view in Fig. 25;

Fig. 27 is a fragmentary sectional view of the interlocking pin shown in elevation in Fig. 26;

Fig. 28 is a fragmentary view of the pawl and ratchet mechanism for operating the trap-door shown in Figs. 4 and 6;

Fig. 29 is a cross-sectional view taken on the line 29, 29 of Fig. 25, showing the loose coupling between the driving shaft and the driving pinion;

Fig. 30 is a front elevational view of the register mechanism;

Fig. 31 is a rear elevation of the same;

Fig. 32 is a side elevation showing the casing in section as viewed from the right of Fig. 31;

Fig. 33 is a fragmentary horizontal longitudinal section of the register mechanism;

Fig. 34 is a perspective view showing the cam controlling the re-setting bar;

Fig. 35 is a fragmentary view showing the re-setting pin and the stop on each of the numeral wheels;

Fig. 36 is a fragmentary perspective view of the main shaft and the re-setting bar;

Fig. 40 is a skeleton view of the interlocking mechanism for the three registers;

Fig. 41 is an elevational view of the three gongs and strikers therefor;

Figure 11:
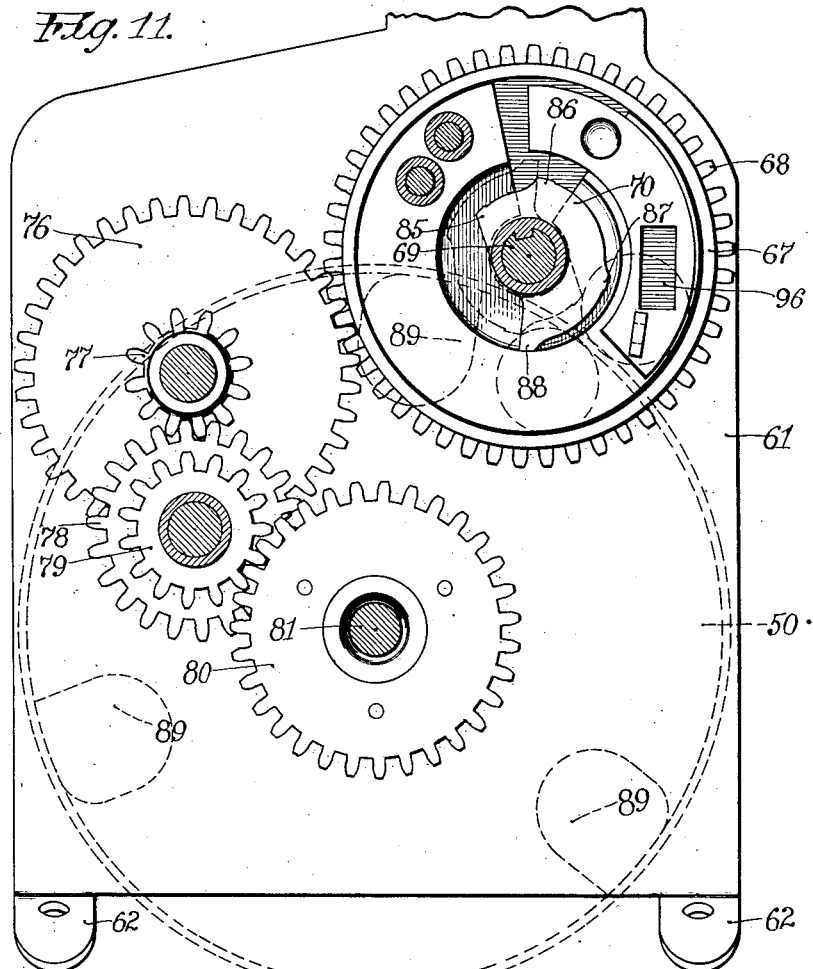
Fig. 11 is a cross-sectional view showing in dotted outline the receiving pan and showing in full line the measuring chamber and the separating and gaging pan therein.

The device which I have chosen to illustrate my invention and which is shown in assembly in Figs. 1 and 2 comprises a coin hopper 1 which is mounted on a casing 2 which in connection with casing sections 3 and 4 incloses the coin and ticket evaluating mechanism which transmits motion through the columns 5 and 6 to the overhead register 7 which contains a coin register 8 and a ticket register 9 as well as a transfer register 10. An operating crank or handle 11 projects outside of the casing 3, 4, and serves as manual means for operating the coin and ticket evaluating mechanism to be described later. The transfer register 10 is operated through a suitable pull 12 and cord 13 conveniently placed for operation by the conductor or operator. The overhead register is provided with a re-setting knob 14 by which the trip registers may simultaneously be set back to zero.

The casing section 4 is connected by means of a section 15 to the bottom section 16 within which is contained an automatically locking coin and ticket receiving box 17, shown in dotted outline in Figs. 1 and 2.

The coin box and the apparatus for automatically locking the same is described in detail in my co-pending application Serial No. 21,540, filed April 5th, 1914, to which reference is hereby made.

In Fig. 3 I have illustrated a suitable metal token which may serve as a ticket and may be employed in connection with the machine which is herewith described.

*Coin and ticket receiving hopper.*

The coin and ticket receiving hopper comprises a box with glass sides through which a passageway is provided for the coins and tickets by way of a zigzag chute 19 which is preferably made of glass. The hopper top is formed of a cup or dished metal top 20 which is stamped into the shape shown in Figs. 4 and 5 and is provided with a number of holes 21 which are of such a size as to permit passage of metal tickets, dimes, nickels, and pennies, but not to permit the passage of quarters or larger coins. The interior of the hopper 20 is provided with a spider member 22 which directs the coins into the opening 21. The spider 22 has sharp upper edges to prevent a token from rising upon the hopper top and thus being subject to being picked up by a dishonest attendant.

A metal collar 23 fits around the bottom of the hopper top 20 and is secured thereto. This collar is provided with suitable fingers 24 which support the glass chute 19 and the metal detecting comb 25 which consists of a thin strip of metal having light spring fingers 26 projecting in an upward direction into contact with the glass sides 27 and serving, in case the coin hopper is turned upside down, to catch and hold any coins which may be in the hopper at that time. The bottom of the zigzag glass chute 19 is closed by a spring trap-door 28 which is pivoted on a pair of lugs 29 formed integral with the strap 30 which is fastened on the lower end of the chute. This trap-door 28 is held by a very light spring and is readily opened by coins falling against it. The trap-door prevents any coins from being shaken back through the chute.

The metal hopper top 20 is supported upon pillars or posts 31 which are secured at their lower ends to a frame piece 32 which is preferably made of a sheet metal stamping. The pillars or columns 31 are notched at the top and bottom and into these notches rubber cushions 33 are placed. The glass sides 27 rest against the cushions 33 and are thereby prevented from rattling or breaking. The glass sides 27 are rectangular pieces, which at their upper end pass under the flange of the hopper top 20 and at their lower end rest upon the hopper bottom member 32. Corner strips 34, best shown in Figs. 1 and 2, protect the corners where the glass plates join and these corner strips are held in place by projections 35 upon the casing section 2.

The bottom of the casing in which the chute 19 is contained is closed by a pair of hinged trap-doors 36 and 37 which are pivoted on lugs 38 and 39 of the hopper bottom 32. The trap-doors 36 and 37 are linked together by means of a connecting rod 40, so that the trap-door 36 moves downward farther and faster than does the trap-door 37. This can readily be arranged by fixing a suitable length of radius between the pivot point of the trap-door and the end of the connecting rod 40. The trap-door 36 has an extension arm 41 bearing a roller 42 which is adapted to be engaged by a finger 43, which will be described later. The finger 43 is connected to the operating crank or handle 11 which at a certain stage of its revolution may be turned in the reverse direction in order to trip the trap-doors, as will be described later. The trap-doors when opened discharge the coins and tickets into a metal funnel 44 which is connected to a chute 45 that discharges into the pan 50. (See Fig. 8.) The trap-doors 36 and 37 are normally held closed by the spring 47 and tokens dropped into the hopper 20 will pass down through the chute 19 and the small trap-door 28 at the end of the chute and will lie upon the trap-doors 36 and 37 where they may be readily inspected by the conductor or guard to insure that the proper token has been deposited.

*Token feeding mechanism.*

The coin and ticket receiving pan 50 which I shall hereafter designate as the token pan 50, is provided with a stationary top 48 which is secured to a plate 49. The pan 50 rests upon a stationary frame plate 51.

The frame which supports this and other mechanisms comprises a base-plate 52 having four short legs 53 for mounting the same in suitable position. Four cornerposts 54, 55, 56 and 57 are mounted at the corners of the base-plate 52. These corner posts or pillars support the frame-plates 58, 59 and 60, and in addition support a number of supplemental frame-plates to form mounting for the various mechanisms.

A frame-plate 61 which is secured at its lower end by a pair of lugs 62 to the base-plate 52 is secured at its upper end by a spacing block to a supplemental or extension plate 63 which forms a continuation of the frame-plate 51 upon which the coin pan 50 rests. The plate 51 has one corner secured to the post 55 and the supplemental plate 63 is secured to the post 56. The plates 51 and 61 are suitable spaced apart by the bolts 64 which hold the parts in fixed relation. The plates 49 and 51 are similarly secured together by means of the bolts 65. The sides of the token pan are formed by a flange which embraces the edges of the cover 48. This flange has openings 66 (see Fig. 10) to allow the escape of dirt and foreign objects. The bottom of the pan 50 acts as a carrying means for withdrawing a single coin at a time from the mass of coins which may be in the bottom of the coin pan and transferring the same to the measuring chamber which lies within the annular rim 67 of the gear wheel 68. The shaft 69 of the gear wheel 68 has a keyway cut therein for the coin gaging cam 70 which has secured to its upper end a skew gear 71 which meshes with the skew gear 72 shown in cross-section in Fig. 8. The skew gear 72 is connected to the skew gear 73 which meshes with the gear 74 mounted upon the main driving shaft 75 which, as shown in Fig. 25, has connected as its outer end the driving handle or crank 11. In this manner motion of the main shaft 75 is transmitted through the shaft 69 and to the gear 68.

Figure 12:
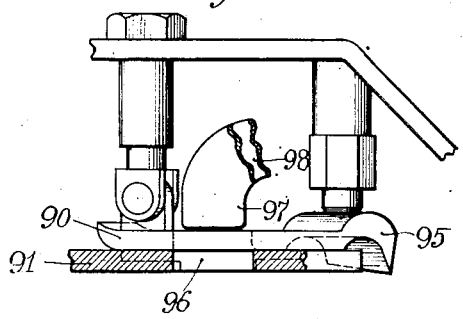
Fig. 12 is a fragmentary view showing the wiper plate and the finding fingers which are projected therethrough to test for the presence of a coin or ticket.
Figure 13:
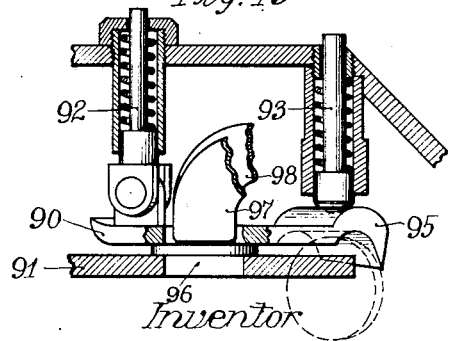
Fig. 13 is a similar view with parts broken away showing a coin under the finding fingers.

The gear 68 meshes with the gear 76 which has secured thereto upon the same shaft a pinion 77. The pinion 77 drives an idler 78 secured to a pinion 79 and the pinion 79 meshes with a gear 80 which is secured to the bottom of the token pan 50. This gear 80 is secured to the shaft 81 which is mounted in suitable ball bearings 82 and 83 in the plates 51 and 61. It will thus be seen that as the handle 11 is turned, the token pan will be rotated. The bottom of the token pan 50 contains a series of holes or openings adapted to receive the coins or tickets and move them up on an incline to the top of the pan where they pass beneath the wiping plate 84 which serves to brush apart coins or tickets that may be sticking together and then pass through an opening in the plate 51 into the measuring chamber which has a circular passage successively decreasing in diameter at definite points on the cam 70 so that tokens of different diameters will be caught between the gage points 85, 86, 87 and 88 and the circular wall 67 for separating the various tokens. The bottom of the token pan 50 contains three openings as shown in dotted line in Fig. 11 and the gear ratio between the token pan and the measuring chamber is as 3 to 1 so that the cam 70 and the rim 67 which are keyed together will make one rotation for each hole or opening in the bottom of the pan. The openings 89 in the bottom of the token pan register with the opening in the plate 51 just before the gage point 85 reaches this position in its revolution. The token therefore has an opportunity to drop down upon the bottom 91, of the measuring chamber and to pass through the passageway formed between the gage point and the wall 67 as these parts rotate together. The token being caught between the corresponding gage point and the rim of the chamber is moved forward under the wiper plate 90 which is normally held against the bottom 91 of the measuring chamber by means of the spring plungers 92 and 93. The wiper plate 90 has a leading upturned edge as shown in Figs. 12 and 13 and a trailing end which is turned downward as shown at 95 in order to force the coin to pass through the sector shaped opening shown in Fig. 11, in the bottom of the measuring chamber. The wiper plate 90 and the bottom 91 of the measuring chamber are apertured as shown at 96 and a pair of finding fingers 97 and 98 are adapted to pass through this aperture and test for the presence of coins and tickets at each of the gage points 85, 86, 87 and 88. The finding finger 97 tests for the presence of a ticket opposite the gage point 85. That is to say it tests for the presence of tickets in the measuring chamber. The testing finger 98 tests for the presence of nickels, pennies and dimes at the gage points 86, 87 and 88.

The shaft 69 which supports the measuring chamber has bearings 99 and 100 mounted upon the frame plate 49 and upon the bowl 101, respectively. The bowl 101 is connected with a chute 102, which is closed by the swinging door 103 under the pressure of the spring 104. When the measuring and evaluating mechanism is put in place upon the casing section 15, the door 103 is held open by means of a prop 105, shown in dotted lines in Figs. 1 and 2. The door 103 then forms a guide to guide the tokens into an inclined chute 106 which has a door 107 at the bottom thereof, as shown in dotted lines in Fig. 2. The door 107 is provided with a depending finger 108 which strikes the back edge of the coin box 17 when the same is held in place, in order to allow free passage of the coin from the measuring chamber of the locked box 17.

The testing fingers 97 and 98 are both pivoted upon a pin 109 mounted upon a lug formed on the plate 49. The means for moving the ticket finding finger 97 comprises a differential clutch and transmission mechanism contained between the frame-plates 59 and 60, and the mechanism for moving the coin finding finger 98 comprises a similar mechanism located between the frame-plates 58 and 59.

Figure 16:
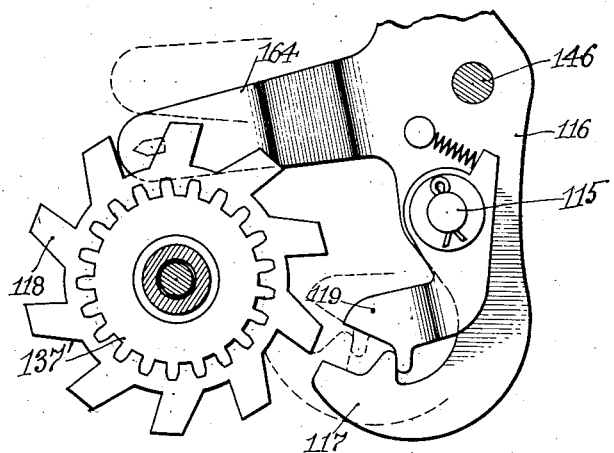
Fig. 16 is a detail view of part of the clutch and differential transmission mechanism.
Figure 17:
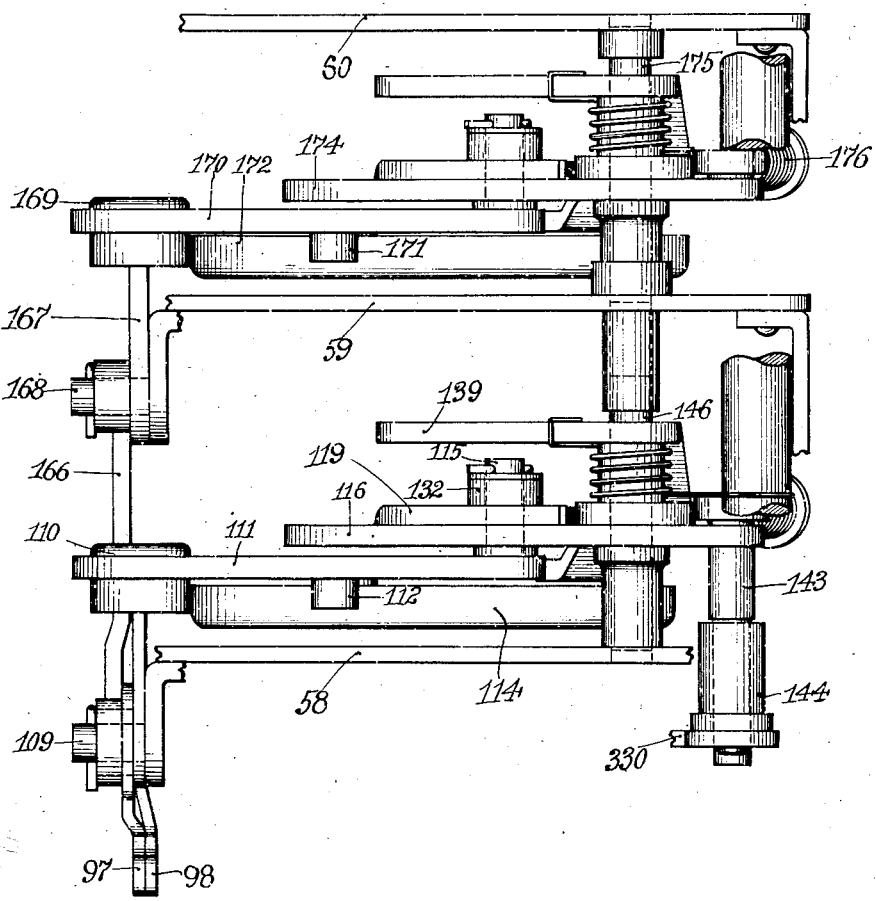
Fig. 17 is a fragmentary dissected view showing the cams and differential levers for operating the two finding fingers.
Figure 18:
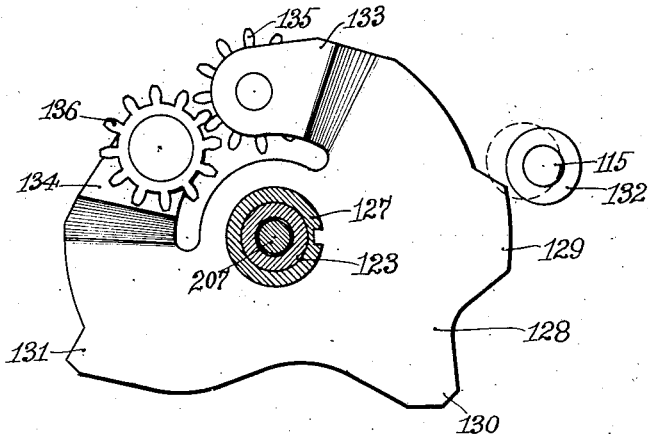
Fig. 18 is a plan view of the knock-off cam and transmission gear for the coin differential lever connected mechanism.
Figure 19:
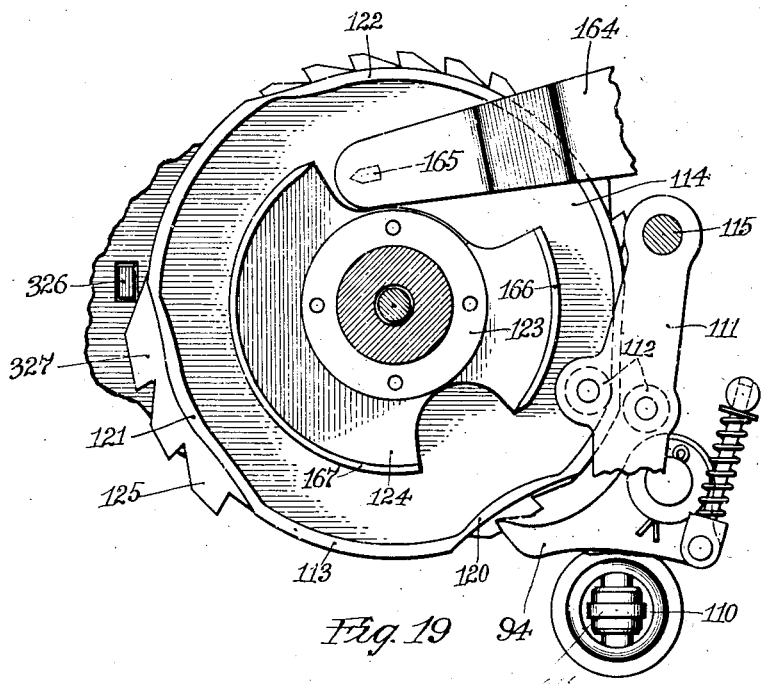
Fig. 19 is a plan view of the controlling cam and differential lever for the coin measuring and evaluating mechanism.

The finger 98 is connected at its upper end by means of a universal joint 110 to the end of the differential lever 111, shown more clearly in Fig. 19. (See also Fig. 17.) The differential lever 111 has a pair of rollers 112 which engage upon opposite sides of the flange 113 of the cam 114. The inner end of the lever 111 is pivoted by means of a pin 115 upon a swinging clutch lever 116 having a hooked end, as shown in Fig. 16. The one end of the lever 116 forms a stop or clutch member 117 for engaging the teeth of the ratchet wheel 118. The stop member 117 has a coöperating latch 119 which holds the wheel 118 against rebound when the mechanism is operated rapidly. The cam 114 has cam portions 120, 121 and 122, for pennies, nickels and dimes, respectively, and these cam portions operate the differential lever and transmission mechanism to transmit angular movements in the ratios of 1, 5 and 10 to the overhead register mechanism.

The cam 114 is secured to a flanged hollow shaft 123 together with another flanged cam 124 and a ratchet 125. The hollow shaft 123 is mounted in ball bearings 126 and is keyed to the skew gear 73. A sleeve 127 is secured to the hollow shaft 123 and has secured thereto the knock-off cam plate 128 which has three cam portions 129, 130 and 131 for engaging the roller 132 after the registering movement for the coin has been completed. The knock-off cam plate 125 has a pair of arms 133 and 134 bearing the meshing pinions 135 and 136 which mesh with each other and with the gear teeth 137 and 137' which are integral with or are secured to the ratchet-wheels 138 and 118 respectively. (See Figs. 14 and 16). A spring held pawl 139 normally engages the ratchet-wheel 138 and a stop 140 normally prevents forward rotation of the ratchet-wheel 138. The stop member 140 is keyed, as shown by the pin 141, to the hooked lever 116. A spring 142 normally holds the stop 140 in engagement with the teeth of the ratchet wheel 138. The pin 143 which is attached to an extension of the lever 116 and is operated upon by the spring 142 fits loosely into an enlarged collar 144 in which it has a certain amount of play. The collar 144 is arranged to be engaged by the inclined end of the bell-crank lever 145 whenever the trap doors of the hopper are tripped and operates in connection with mechanism, later to be described, to actuate the interlocking mechanism. A spring pressed pawl 94 engages the teeth arranged in groups on the ratchet plate 125 to prevent backward rotation of the mechanism during the operation of registering a token.

As the cam 114 rotates the cam portions 120, 121 and 122, respectively, operate to move the differential lever 111 back and forth because of the engagement of the rollers 112 on each side of the flange 113 of the cam. So long as the finding finger 98 can pass freely down through the aperture 96 due to the absence of a coin thereunder, the lever 111 will be swung freely about the pivot 115 and the lever 116 will not be moved, but as soon as the end of the testing finger 98 is stopped by a coin which blocks the aperture 96, the opposite end of the lever 111 is moved and the entire lever 116 is swung about the shaft 146 (see Fig. 17) with the result that the stop 140 is disengaged from the ratchet-wheel 138 (see Fig. 14) but the clutch member 117 engages the ratchet-wheel 118 and prevents rotation thereof. The knock-off cam 128 which is secured to the sleeve 127 and which, in turn, is secured to the hollow shaft 123, rotates with the cam 114 and inasmuch as the ratchet-wheel 118 has been stopped, this ratchet-wheel normally being free to move, and the ratchet-wheel 138 has been released, this ratchet-wheel being normally stopped, a certain degree of angular movement depending upon the length of the holding cam portions 166 and 167, which determine the extent of operation of the stop members, will be transmitted through the gear wheel 147, the idler 148 and the gear 149 of the stub shaft 150 which is mounted for rotation in the housing 151, secured to the plates 58 and 59. The stub shaft 150 has a squared end 152 which engages in a socket 153 secured to the register operating shaft 154. The shaft 154 passes up through the column 5 which is composed of a sleeve or tube 155 secured by a collar 156 and coupling 157 at its lower end to the housing 151. The upper end of the tube 155 is incidently threaded to receive the nipple 158. A collar 159 is secured to the top of the tube 155 forms a support for the register casing. A stub shaft 161 is secured to the register operating gear 162 and is connected to the driving shaft 154 by the slotted tongue and groove coupling 163.

The clutch lever 116 which is operated by the differential lever 111 has an extending arm 164 which bears a pin 165, shown in dotted lines in Fig. 19, which controls the length of time that the stop finger 117 is held in contact with the ratchet-wheel 118. The pin 165 moves outside of the cam portions of the cam 124 during the time that nickels and dimes, respectively, are being registered by the mechanism. The time during which pennies are registered is so short that I find it unnecessary to employ a cam portion to hold the lever 164 in its outer position. The function of the cam portions is to hold the clutches in the transmitting position for a predetermined length of time, and to allow the coin to be moved on forward and out of the measuring chamber.

*Tickets registering mechanism.*

As above explained the metal tickets are caught between the gage point 85 and the wall of the chamber and are moved across the opening 96 where their presence is detected by the finding finger 97. This finding finger is pivoted at 109 and is connected by a link 166 with a bell-crank lever 167 pivoted on the stud 168 which is secured to the plate 59 of the frame-work. The upper end of the bell-crank lever 167 is secured by a universal joint 169 to a differential lever 170 which operates in connection with the flanged cam 172 in the same manner as the lever 111 operates in connection with the cam 114. The cam 172 has, however, only one operating portion 173, due to the fact that the testing finger 97 is operated only once per revolution of the measuring chamber. A pair of rollers 171 engage the flange of the cam 172 and when the cam portion 173 moves the rollers inwardly the testing finger 97 is moved down to the aperture 96 and if a ticket is found in the measuring chamber, the testing finger will be stopped and the back end of the lever 170 will be swung forward. The back end of the lever 170 is pivoted upon the stop lever 174 which is free to oscillate about the shaft 175 but is normally held under the tension of the spring 176 in such position that the clutch or stop member 177 (see Fig. 10) is disengaged from the ratchet-wheel 178 and the detent or stop 179 (see Fig. 9) normally engages the ratchet-wheel 180. This mechanism is substantially the same as that described in connection with the differential lever and transmission mechanism for operating the overhead coin register. A knock-off cam plate 181 (see Fig. 7) carries the meshing pinions 182 which mesh with each other and with the gears 183 and 184 which are formed integral with the ratchet-wheels 180 and 178 respectively.

The clutch lever 174 is provided with an arm 185 which is similar to the arm 164 and which engages the holding cam 186 in order to transmit a complete movement to the overhead ticket register.

The knock-off cam plate 181 is secured to a sleeve 187 which, in turn, is fastened to the hollow shaft 188. The shaft 188 is secured to the cam 172 and also to the shaft 123 and sleeve 127 so that the cams 114 and 172 and the knock-off plate 128 and 181 rotate together, transmitting either an idle motion to the idle ratchet-wheels 118 and 178 or transmitting a register actuating motion through the gears 183 and 137 to the ticket and coin register mechanisms respectively.

The gear wheel 183 and the ratchet wheel 180 are secured together and have an extending hub 189 which is slotted at right angles, as shown in Fig. 8, and this hub 189 extends into a collar or bearing 190 which is secured to the top of the frame plate 60 of the mechanism.

Motion is transmitted to the overhead ticket register 9 through the column 6 which comprises a sleeve 191 secured by means of a collar 192 and a ratchet nut 193 to a spider 194 which, in turn, is secured to the frame posts 54, 55, 56 and 57 above the frame plate 60. The sleeve 191 is secured to the overhead register by means of a bolt or rod 195 which is fastened at its lower end by means of the thumb-nut 196 to a washer 197 that closes the bottom of the sleeve 191 and at its upper end by hooking into a hole in the sleeve 198 which, in turn, is threaded to a short stub 199 which is secured to the bottom plate 200 of the overhead register.

A driving gear 201 for the ticket register is secured to a short driving sleeve 202 and this sleeve is connected, by means of a slotted driving sleeve 204 which fits over a key 203 and is held inside of a ring 205 which is formed integral with the key 203, to the driving sleeve 189 by means of a collar 206 which has projections engaging in the slot cut in the sleeve 189. An interlocking rod 207 projects down through the column and rests upon an interlocking lever 208, which will be described later. The ratchet nut 193 is provided with a ratchet 209 which projects within the casing section 2 and is engaged by a spring pawl member 210 which has a tail extending down the main frame in proximity to the sealed aperture 211. Backward rotation of the nut 193 is thereby prevented and as the connection of the overhead register to the casing and the casing upon the mechanism is controlled by the nut 193, it can be seen that in order to take the mechanism apart, it will be necessary to break the glass seal at 212 in order to engage the tail of the pawl 210 to release the ratchet nut.

*Over-head register mechanism.*

The frame-work of the overhead register includes the bottom plate 200 and a top plate 215 to which is secured the top of the casing 216. The top and bottom plates are held apart by means of side frame plates 217, 218, between which is included the mechanism for the coin register 8, plates 219 and 220 between which is included the mechanism for the ticket register 9 and the plates 221 and 222 between which is placed the transfer register 10. The ticket registering mechanism 9 comprises the numeral wheels 223 for making a trip record of the tickets collected and counted during one trip. A number of accumulators or totalizer wheels 224 are also provided for totalizing the number of tickets taken over a number of trips. The main driving gear 201 (see Fig. 37) which is actuated through the column meshes with a smaller gear 225 which is connected by a pin 226 to the cam 227. The cam 227 has a loose connection by means of the pin 226 but the gear 228 is connected rigidly to the gear 225. This is to allow the transmission of motion positively to the gear 229 for operating the registers, but to allow of a certain flexibility of action under certain abnormal conditions. A shaft 230 extending between the top and bottom plates and having bearings therein is provided at its upper end with a slot into which is fitted a striking arm and hammer 231 for striking the gong 232. Sometimes a coin or ticket becomes wedged or jammed in the machine and a slight backward motion is required to relieve the same. If the jamming should occur just after the pin 234 drops off of the back of the cam 227 unless some play in the driving mechanism of the cam were provided for, the machine would be completely stopped against either forward or backward movement.

Figure 37:
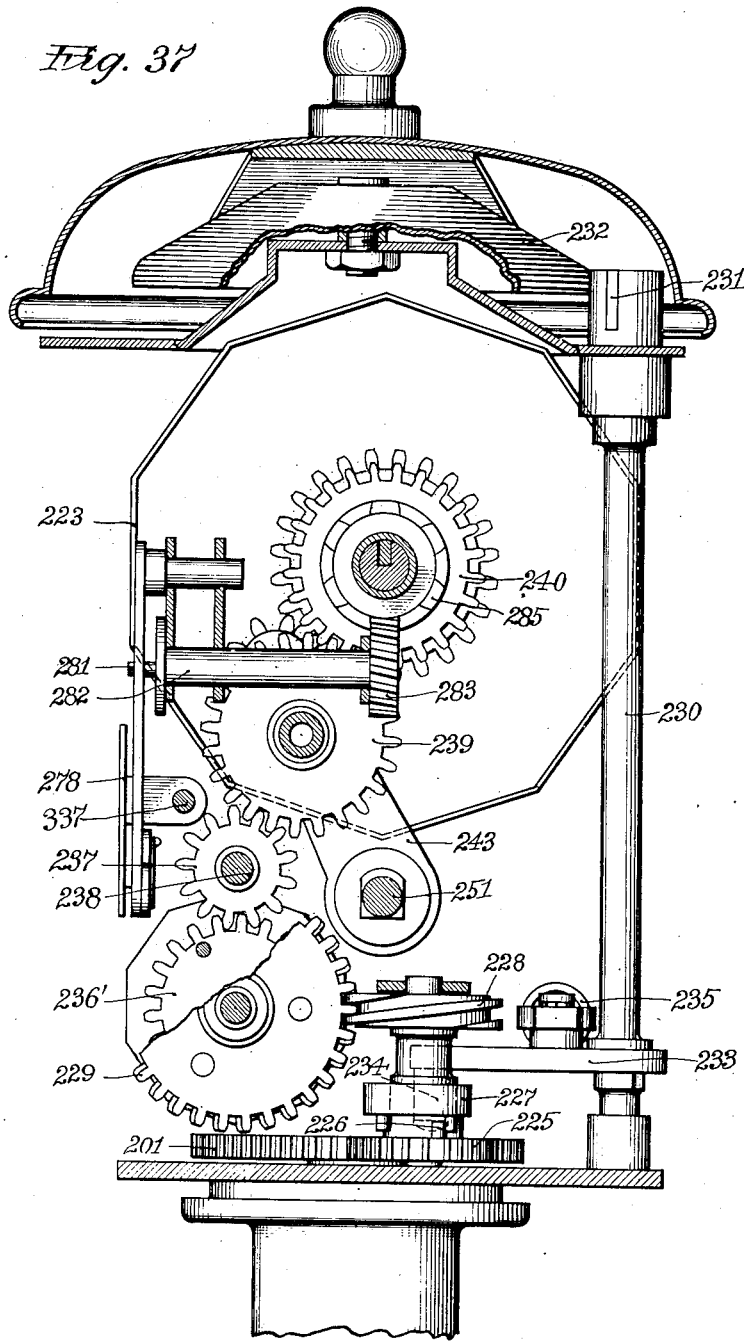
Fig. 37 is a partially sectional end view of of the register, viewed as from the left of Fig. 31.

The lower end of the shaft 230 has connected thereto an operating arm 233 bearing a roller 234 shown in dotted outline in Fig. 37, which roller engages the cam 237. A spring 235 normally urges the arm 232 toward the cam 227 and when the roller 234 drops off the edge of the cam 227 causes the striking arm 231 to strike the gong 232.

The coin register 8 is provided with a gong 235 and the transfer register 10 is provided with a gong 236, both of which gongs are operated by similar striking mechanisms.

The gear wheel 229 has secured thereto another gear wheel 236' and both of these wheels are secured to the first or unit numeral wheel 224 of the totalizing register. The gear 236' meshes with a pinion 237 loosely mounted on the shaft 238. The idler 237 transmits motion through another idler 239 to the unit trip register numeral wheel 223 through the gear 240. The totalizing numeral wheels 224 are connected together by carry over pinions in a manner described and shown in my copending application Serial No. 808,381 filed Dec. 23, 1913. The numeral wheels 223 are connected together by carry-over pinions 241 which are mounted on studs 242, carried by the re-setting arm 243. The carry-over pinions are held against accidental movement while they are out of mesh by means of the spring fingers 244 so that they will drop back into mesh. The construction and operation of the carry-over mechanism is described and claimed in the above application referred to and will not be described in detail in this connection. Suffice it to say that the numeral wheels of all of the trip registers are rotatably mounted upon a hollow shaft 244' which may be built up of several sections, but in effect constitutes a single shaft which contains a toothed bar 245. The end of this bar 245 normally rests in a notch 246 in the cam 247 which is fastened to the end plate 222. A grooved collar 248 which is slidable endwise upon the shaft 244 but has a key extending into the slotted end of said collar is provided with a resetting knob 249 by which the shaft 244 may be rotated when the register is unlocked for setting. When the act of resetting occurs the toothed bar 245 is moved endwise to the right in Fig. 33 so that the teeth engage notches in the hubs of the numeral wheels to bring the numeral wheels back to zero. Each one of the numeral wheels has a projection 250 for engaging the ends of the studs 242 so that the numeral wheels will be stopped at zero when the resetting operation is completed. Normally the stud 242 lies in the full line position, shown in Fig. 35, with respect to the stop 250, but when the register is unlocked for resetting the studs 242 are moved out into the path of the stop 250. The arms 243 which carry the studs 242 are all keyed to a squared shaft 251 and this shaft has a number of arms 252, 253 and 254 (see Fig. 30) secured thereto, each engaging a notched cam plate 255, 256 and 257 which are secured to the sleeve 244 and rotate therewith. The action of these arms and cams is to throw the carry-over pinion bearing arms 243 outwardly so that the studs 242 come into the path of the stops 250 and at the same time disengage the carry-over pinion.

A pair of arms 259 which are connected together, are pivoted on a pin 261 and carry at their upper end a pair of rollers playing in the groove of the collar 248. The cam arm 252 carries a catch or detent 263 which normally lies on the inside of one of the arms 259, and prevents the arm 252 from being moved outwardly and thereby keeps the pinions in mesh during violent operation. The collar 248 carries a ratchet which engages the pawl 264 and prevents the resetting knob being turned backward. The lower ends of arms 259 are joined together by a pin 265 which forms a pivot for the connecting rod or link 266 to the interlocking lever 267 which interlocking lever is connected by a rod 268 to the interlocking catch or detent 269 for interlocking the transfer register actuating mechanism with the rest of the mechanism. The left hand arm 259 shown in Fig. 32, is provided with an extension or bell-crank 270 (see Fig. 40) which is connected by the link 271 to the resetting target 272.

A rod 273 which is connected to the right hand arm 259 extends outside of the frame-plate and is provided with inwardly extending lugs 274 and 275 which bear pins 276 and 277, respectively, that pass through the frame-plate adjacent the arms 253 and 254 and normally prevent the same from being moved outwardly and thus disconnecting the carry-over pinions as might occur in case of a violent actuation of one of the registers. The rod 337 serves as a slide for the in and out target 278 which is actuated by the lever arm 279 by means of the slot 280 and eccentric pin 281. The eccentric pin 281 is mounted on a transverse shaft 282 (see Fig. 37) and connected by means of the skew gear 283 which meshes with the coöperating skew gear 285, shown more clearly in Figs. 33 and 37.

It can now be seen that it will be necessary to pull out the handle 249 in order to allow unlocking of the arms 252, 253 and 254 so that the arms 243, all of which are secured to the same shaft 251, may disengage the carry-over gears and place the studs 242 in the path of the stops 250. In this connection it is to be noted that the detent 263 performs the same function for the arm 252 as do the pins 276 and 277 for the arms 253 and 254.

As the resetting knob 249 is turned in a clockwise direction, the end pin of the bar 245 which lies in the depression 246 will be moved longitudinally so that the various teeth upon this bar engage notches in the hubs of adjacent numeral wheels and when a complete revolution of the resetting knob 249 has been made the arms 252, 253 and 254 will drop into the notches in their coöperating cam disks 255, 256 and 257, respectively, after which the spring 286 restores the arm 259, the resetting knob 249, the toothed bar 245 and the interlocking mechanism connected to the arms 259 as well as the resetting target 272.

Transfer register mechanism.

As explained in connection with Figs. 1 and 2, the ticket register cam is actuated by means of a pull ball and cord 13. The cord 13 is secured to a lever arm 287 secured to a stud shaft 288 which is freely movable in the sleeve 289 mounted in a frame plate 290. A depending arm 291 rigidly secured to the shaft 288 bears a pin 292 which passes through a hole in the block 293. The block 293 has another hole at right angles to the first and a pin 294 which is secured to an oscillating plate 295 passes therethrough. The pins 292 and 294 are of uniform diameter throughout their length so that the block 293 is able not only to have a rotary motion with respect to each one but also a longitudinal motion in the direction of the axis of each one.

Figure 38:
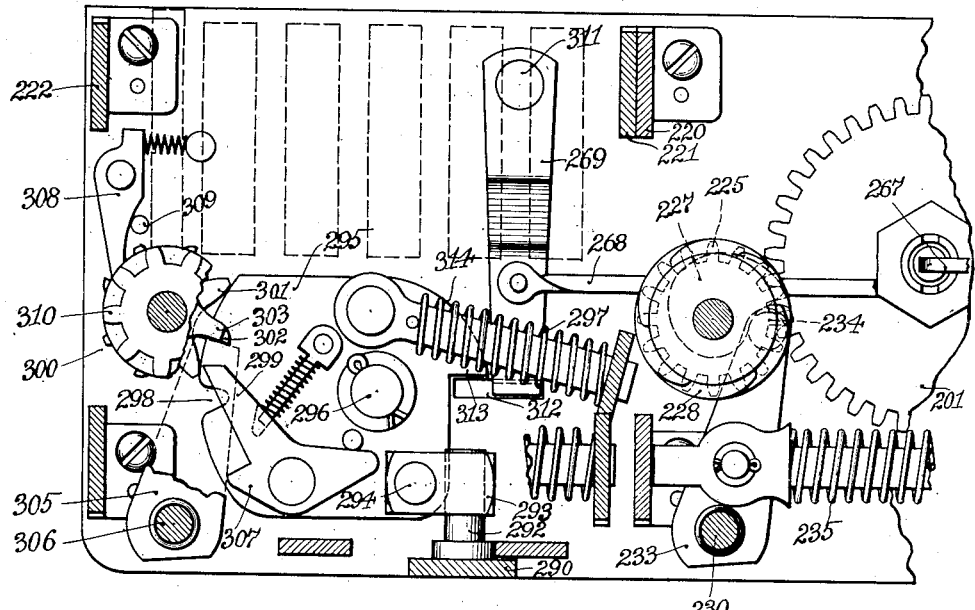
Fig. 38 is a horizontal sectional view of the left half of the register shown in Fig. 31, showing in plan view the manual operating means for the transfer register.
Figure 39:
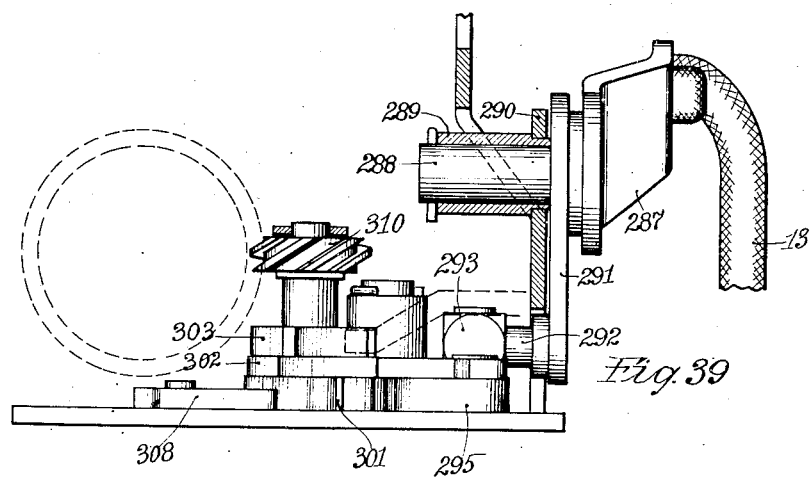
Fig. 39 is an elevational view of the same.
Figure 42:
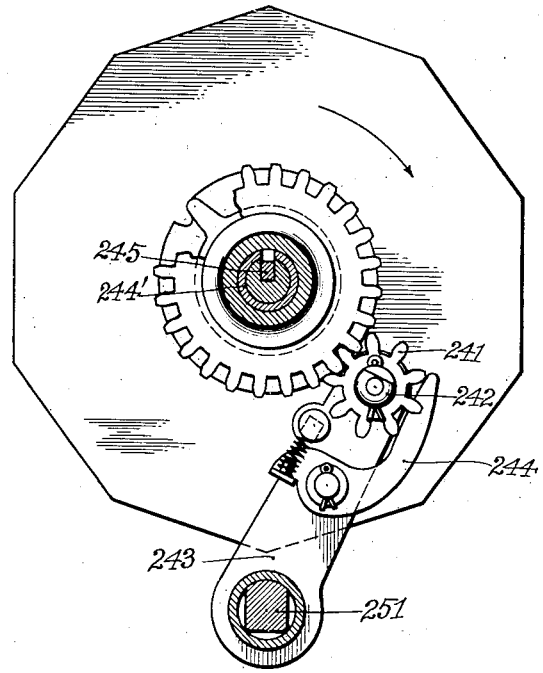
Fig. 42 is a cross-sectional view showing the Geneva mechanism for transferring one count for each revolution of the register disk.
Figure 43:
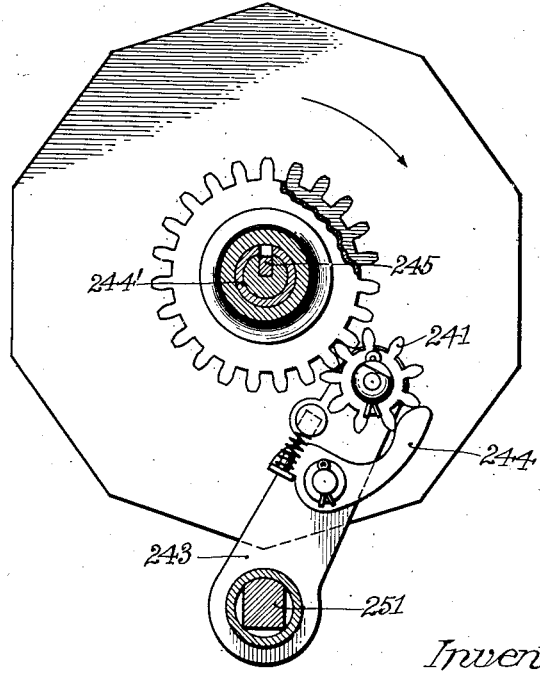
Fig. 43 is a simular view showing a straight geared connection between the driving mechanism and the register disk.

The oscillating plate 295 is pivoted on the pin 296 and is normally held in position as shown in Fig. 38 by the spring 297. The oscillating plate 295 is provided with a notch 298 and an engaging pawl 299 for engaging the teeth of the double Geneva pinion 300. This pinion 300 comprises a lower part having four teeth 301, intermediate teeth 302 displaced one-half the pitched distance of the teeth 301 and the teeth 303 which are in line with the teeth 302 but are of relatively less height. The first movement of the oscillating plate 295 brings the end of the pawl 299 against one of the teeth 302 and starts to rotate the Geneva pinion 300 in such position that the notch 298 in the oscillating plate 295 will engage one of the teeth 301 and will advance the pinion 300 by one tooth. An arm 305 which is secured to the striker shaft 306 engages the teeth 303 and this arm serves not only as a holding pawl but also as an actuating means for the gong striker. The gong is not struck until a complete movement of the toothed wheel is accomplished. In other words, until a complete transmission has been made. The pawl 299 has an additional stop 307 which engages the next tooth 302 when the movement is completed to insure that the gong striker arm 305 will drop off of the tooth 303. A holding pawl 308 is held by means of a spring against a stop 309, the end of the pawl lying normally in the path of the teeth 301. The pawl is so spaced relative to the teeth 301 that as soon as the oscillating plate 295 has begun to move and has moved to the point where the notch 298 engages one of the teeth 301, this pawl 308 will drop back of the next tooth, and in this manner will prevent the oscillating plate from being returned to its normal zero position, thereby compelling a complete movement of the oscillating plate before the same is allowed to return to zero. This full stroke mechanism insures complete and correct operation.

While I have described the pinion wheel 300 as being composed of three separate gears, I find in practice that it is practicable to make these gears out of one piece of metal to insure rigidity and the proper alinement. A skew gear 310 is secured by a collar to the wheel 300 and serves to advance the register numeral wheels.

The oscillating plate or disk 295 is interlocked with the resetting mechanism by means of the detent arm 269 which is pivoted at one end on a pin 311 shown in Fig. 38. The opposite end of the arm has a depending projection which projects through the slot 312. The disk 295 has an arcuated edge 314 and a shoulder 313 so that the disk and the arm 269 are mutually interlocked. That is to say the resetting mechanism cannot be operated when the disk is off normal and the disk cannot be operated when the resetting mechanism is off normal.

Trap-door operating-mechanism and interlock mechanism.

The trap-doors 36 and 37 upon which the coins and tickets drop, are operated by a reverse rotational movement of the handle 11 at a given point in its revolution. The arm 43, which trips the trap-doors, is pivoted on a pin 316 secured to one of the frame-members and is connected by a link 317 to an arm 318 by the pin 319, which also forms the pivot for a spring-pressed detent or pawl 320. The plate or arm 318 is pivoted at its lower end to one of the frame-members and bears at its upper end a pin 321, which plays in a slot in the upturned end of the bell-crank interlocking lever 145 (see Fig. 14).

The detent 320 has a hooked end 338 which normally rests upon the cam 322 (see Fig. 28) which is provided with a notch 339 to engage the same when the handle 11 is substantially horizontal and points to the left in Fig. 9. When the notch engages the nose of the pawl or detent 320 the door-operating finger 43 is swung in a counter-clockwise direction in Fig. 9, shown in clockwise direction in Fig. 4, to trip the trap-doors 36 and 37 and to dump the coins and tickets into the coin-pan 46. As the coins and tickets are now out of sight, if no interlocking means were employed it would be possible for the operator to reset the register before all the fares for a given trip were rung up, although no coins would be in sight upon the trap-doors. It is a function of the bell-crank interlocking lever 145 to trip the interlocking mechanism when the trap-doors are operated, to prevent the above-described manipulation.

As explained in connection with Fig. 40, the trip-register can be reset only when it is possible to swing the arm 267 about its pivot. This depends upon its ability to depress the interlocking rod 207 shown in Fig. 20. The lower end of the interlocking rod 207 rests upon the end of the arm 208 shown in Figs. 25 and 8. The arm 208 forms an extension of a lever which is pivoted on the pin 324, passing through the lugs 325. The opposite end of the arm 208 is provided with a plunger 326, which passes through an opening in the frame-plate 58 at the edge of the ratchet-plate 125, which is secured to the differental lever controllng cam 114. The cam plate 125 (see Fig. 19) is provided with a projecting portion 327, which passes over the top of the plunger 326 at the same time that the hooked end 338 of the detent 320 (see Fig. 28) rests in the notch or cutaway part 339 of the cam 322. Thus the operator cannot start to reset and at the same time dump the trap doors 36 and 37.

The arm 208 (see Fig. 26) also bears a spring plunger 328, which upon movement of the arm 208 is pressed upward against the bottom of the ratchet-plate 125 and drops into the first opening or aperture 329, a series of which is formed in the plate 125 immediately above the spring plunger 328. The construction of the spring plunger 328 is shown in Fig. 27. The spring 329' forms no part of the plunger but serves merely to hold the arm 208 in its normal position. The spring plunger allows the arm 208 to be operated whether an aperture 329 is directly in alinement therewith or not. As soon as the cam-plate 125 is rotated so that one of the holes 329 does come in alinement with the plunger 328, the plunger will drop into the hole and thus lock the operating mechanism.

Figure 14:
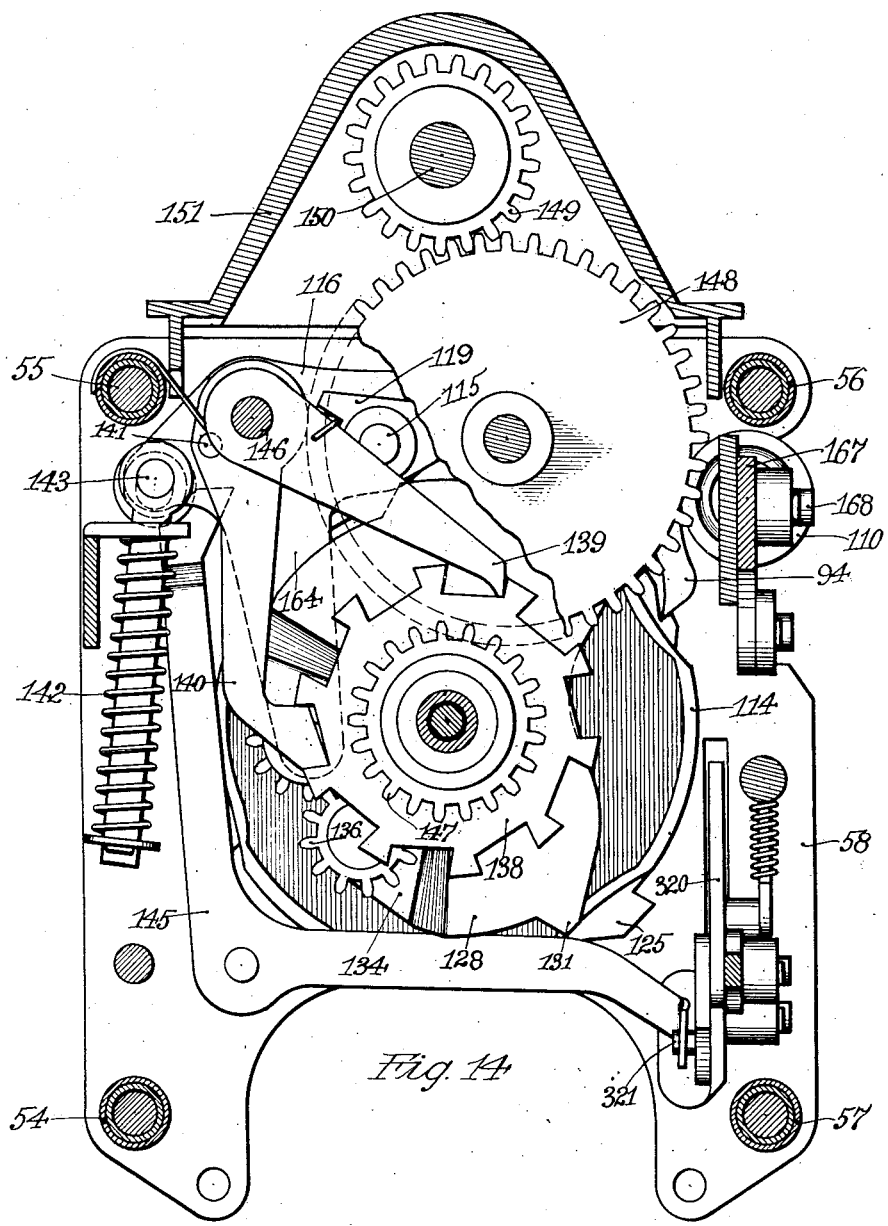
Fig. 14 is a fragmentary plan view of parts of the clutch and differential transmission mechanism.
Figure 15:
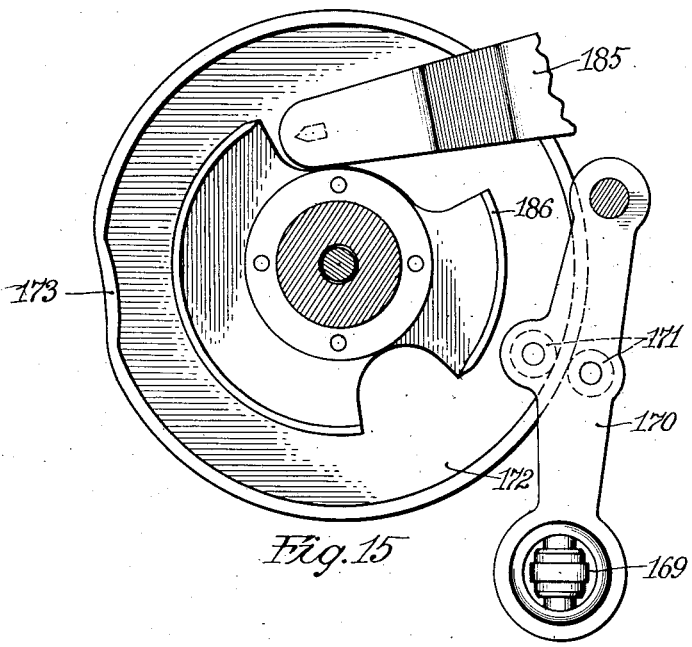
Fig. 15 is a plan view of the cam and differential lever controlled thereby for operating the ticket finding finger.

The above-described part of the interlock prevents the machine from being operated while the register is being reset. To insure that all of the coins in the coin-pan have been registered, the following mechanism is provided:

The main driving-shaft 75 is fitted with a ratchet thread of five turns cut therein at 329 and these threads are normally engaged by the nose of an interlocking pawl 330, which is pivoted loosely upon a pin 143, secured to an extension of the stop arm 140 (see Fig. 14). The stop arm 140 is operated by the differential lever for each transmission, and, when the transmission occurs, the pin 143 moving outwardly disengages the nose of the pawl 330 from the ratchet threads 329, and the pawl, under the influence of the spring 331, drops back to the beginning of the threads, at the same time sliding the projection 332 along the slot 333 formed in the bracket 325 (see Fig. 26), thereby preventing the arm 208 from being swung about the pivot 324, thereby preventing unlocking of the overhead register before resetting. Thus, each time that the differential lever is operated to transmit motion for registering a coin, the pawl 330 will interlock with the arm 208 and prevent resetting of the register until five complete turns of the main shaft 75 have been made to bring the projection 332 on the pawl 330 out of the way of the arm 208.

It is desirable that the registering mechanism be not turned backward, even though the handle 11 is turned backward to dump the trap-doors 36 and 37. The skew gear 74, which is loosely mounted on the main shaft 75, is operated by a lost-motion connection comprising a pair of projections 334, fitting into a wide slot 335 on each side of the hub of the pinion 74.

Tripping the trap-doors by a backward motion of the handle 11 operates the bell-crank interlocking lever 145 and disengages the interlocking pawl 330 from the threads 329 in the same manner, so that it will be necessary, after tripping the trap-doors, to turn the handle 11 through five complete turns before the register may be reset. If during these five turns a coin is registered, the pawl 330 will be disengaged and will interlock the mechanism, and five more complete turns after the registration of a coin will be necessary to unlock the machine.

As above explained, the connection between the pawl 330 and the pin 143 is loose so as to allow operation of the pawl by the arm 145, without moving the pin 143. This connection comprises a collar 336 with an oblong hole or slot therethrough, so that the collar may be moved on the pin 143 independently. The spring 331 always tends to hold the nose of the pawl against the ratchet-threads 329.

The above interlocking mechanism between the overhead register and the operating mechanism, is a mutual interlock to prevent interference of operation. The trap-doors are interlocked with the overhead trip-register to compel accurate trip registration.

The operation of the machine will not be specifically described, as the same has been set forth in connection with each of the mechanisms described, the general operation of the machine being as follows:

Transfers are rung up on the transfer-register in the ordinary manner, and this may be done while coins and tickets are being registered, as there is no possibility of interference between them. Coins and metal tickets are deposited in the hopper 1 and drop upon the trap-doors 36 and 37, where the same may be inspected by the operator. The operator trips the trap-doors by a backward rotation of the handle 11 and then turns the handle in a forward direction to register the coins and tickets. The coins and tickets pass, one at a time, through a measuring chamber, where, by suitable finding means, the presence of a token of given character is detected.

If the given token which is found proves to be a coin, as determined by the position in which it is found in the graduated passageway, its value is recorded on the coin-register. If, on the contrary, the token proves to be a metal ticket, as determined by its particular position in the graduated passageway, it is registered upon a separate register.

The above-described registers include a trip-register and a totalizing register, of which the trip register is operated by a common means that is interlocked with the operating mechanism for evaluating the tokens.

It is apparent from the above that the tokens need not necessarily comprise coins and tickets, but may comprise entirely coins or entirely tickets, or any proportion of coins and tickets; or, in fact, any objects of graduated sizes.

It is also obvious that, instead of employing two registers for two classes of tokens, any number of registers and the proper corresponding mechanism may be employed for registering separately any desired number of the tokens.

While I have described one specific embodiment of my invention with considerable particularity, I have done so not with the purpose or intent of limiting my invention to such particular embodiment, but to set forth clearly one manner in which the invention may be practiced, as required by the statutes. I am aware that the invention may be practiced in a great variety of forms, and with numerous modifications, and I therefore intend that the appended claims, which point out particular features of the invention, be construed with all due liberality.

What I claim as new and desire to protect by Letters Patent of the United States is the following:

1. In combination, a token-receiving hopper for receiving tokens of different denominational systems, token-gaging means, token-carrying means for conveying tokens from said hopper to said gaging means, a plurality of registers, and means coöperating with said gaging means for registering all of the tokens of one denominational system upon another register.

2. In combination, a token-receiving hopper for receiving tokens of different denominational systems, registers for registering the tokens of each system, token-gaging means adapted to receive tokens from said hopper, said gaging means selecting said tokens indifferently and moving them through a pre-determined path, the tokens of different denominational systems having distinct and independent positions on said gaging means, and means for operating with said gaging means for registering tokens which are multiples of one denominational system upon one register, and for registering tokens which are not a multiple of said system upon another register.

3. In combination, a token receiving hopper for receiving indiscriminately tokens of different denominational systems, token gaging means, a carrying element for conveying tokens one at a time from said hopper to said gaging means, a plurality of registers, and means controlled by the gaging means for registering all tokens of one denominational system upon one register and means for registering all tokens of a different denominational system upon another register.

4. In combination, a token receiving hopper for receiving indiscriminately tokens which are in part not even multiples of a given value, a token carrying element, token gaging means, a plurality of registers and means controlled by the gaging means for registering tokens which are multiples of a given value upon one register only and means for registering tokens which are not multiples of said value upon another register.

5. In combination, a token receiving hopper for receiving a plurality of denominations of tokens, token evaluating means, token separating and conveying means for feeding said tokens one at a time to said evaluating means, a plurality of registers and means controlled by said evaluating means for registering tokens which are multiples of a given monetary standard upon one register only and for registering tokens which are not multiples of said standard upon another register.

6. In a device for sorting and registering tokens, a rotatable carrying element for the tokens, token identifying or gaging means having different characteristic positions for gaging the different denominations of tokens, a plurality of registers, a plurality of mechanisms controlled by said gaging means to operate the same, one for each kind of tokens, and cam means operating synchronously with the gaging means for controlling the proper mechanism to cause registration of the respective tokens.

7. In combination, a receptacle adapted to receive a quantity of tokens of different character, registers for registering the tokens of each character, means adapted to select indifferently tokens of different character and move them all in a common predetermined path, gaging means for identifying the tokens, and means adapted to engage the tokens while in said path, said gaging and said engaging means governing the actuation of the corresponding registers to register all the tokens of one character upon one register only and all the tokens of a different character upon another register only.

8. In combination a plurality of registers for registering tokens of different denominational systems, an apertured stationary support for said tokens, gaging means for moving the tokens in the same path over said apertured support, the tokens of different denominational systems moving over said aperture at distinctive periods, in the operating cycle of said gaging means, means intermittently actuated through said aperture and governing means operated by the engagement of said latter means with a token for controlling the registration of the tokens upon the corresponding register.

9. In combination a stationary element, a plurality of registers for registering tokens of different denominational systems, token gaging or identifying means for moving tokens of different denominational systems through the same path over said stationary element, in distinctive periodic order, and means coöperating with said gaging or identifying means for actuating said registers in accordance with the tokens moved over said stationary element.

10. In combination a plurality of registers for registering in terms of fares as units tokens of different denominational systems which are not even multiples of a common unit, a hopper, means for withdrawing tokens indifferently from said hopper, token gaging means and means governed by said gaging means to register each token upon the corresponding register.

11. In combination, a pair of registers for registering in terms of fares as units tokens of two denominational systems which are not even multiples of a common unit, means for withdrawing said tokens indifferently one by one, token gaging means and means controlled by said gaging means for registering the tokens of each denominational system upon the corresponding register.

12. In combination a plurality of registers, a token receiver for receiving tokens of different denominational systems, means for withdrawing tokens from said receiver one by one, a discharge chute, means for moving all of said tokens through a predetermined path in distinctive periodic order from said receiver to said chute, means for engaging each token during its transit through said predetermined path, and means governed by such engagement to register each token upon the appropriate register.

13. In combination a plurality of registers for registering tokens of different denominational systems, a receiver for receiving the tokens in bulk, a rotary coin carrying element having different angular positions for said tokens, cam means operating in unison with said carrying element, and having cam surfaces corresponding to the positions on said carrying element, and means controlled by said cam means for registering each token upon the corresponding register.

14. In combination a plurality of registers for registering tokens of different denominational systems, a receiver for receiving said tokens, a rotary token carrying element, cam means operating in unison with said carrying element, said cam means having surfaces corresponding to the carrying positions of said carrying element, separate engaging means for each system of tokens, said means being controlled by said cam means, and means for actuating the registers in accordance with the tokens engaged by said engaging means.

15. In combination, a plurality of registers for registering tokens of different denominational systems, a receiver for receiving tokens in bulk, a rotary token-carrying element, cam means operated in unison with said carrying element and having surfaces corresponding to the carrying positions of said carrying element, separate engaging means for each system of tokens, said engaging means being controlled by said cam means, clutch mechanism controlled by said engaging means, and means controlled by said clutch means for actuating said registers in accordance with the tokens to be registered.

16. In combination, a hopper for receiving a plurality of tokens of different denominational systems in bulk, a carrying element for removing said tokens indifferently one by one from said hopper, a gaging or identifying element for moving said tokens in a pre-determined path in distinctive periodic order, a plurality of registers, one for each denominational system of tokens, and means controlled by said identifying element for operating the registers in accordance with the tokens as they pass said identifying element.

17. In combination, a hopper, a rotary carrying element, a rotary identifying element, a plurality of registers for registering different denominational systems of tokens, and means coöperating with said identifying element to control the operation of said registers for registering the tokens one by one as they pass said identifying element.

18. In combination, a hopper for receiving in bulk tokens of different denominational systems, a rotary carrying element for removing the tokens indifferently one by one from said hopper, rotary gaging means having positions corresponding to the different denominational systems of tokens, cam means having cam surfaces corresponding to the gaging position of said gaging means, and a plurality of registers controlled by said cam means for registering each denominational system of tokens.

19. In combination, a hopper for receiving in bulk tokens of different denominational systems, a rotary carrying element for removing indifferently one by one the tokens from said hopper, rotary identifying means having positions corresponding to the different denominational systems of tokens, cam means having cam surfaces corresponding to the identifying positions on said identifying means, finding fingers controlled by said cam means for engaging the tokens of each system, and a plurality of registers controlled by said finding fingers for registering the tokens of each system.

20. In combination, a hopper for receiving in bulk tokens of different denominational systems, a rotary carrying element for removing said tokens indifferently one by one from said hopper, rotary identifying means having identifying positions corresponding to the different denominational systems of tokens, cam means having cam surfaces corresponding to the identifying positions of said identifying means, finding fingers for each denominational system of tokens, controlled by said cam means, clutch means, a plurality of registers for registering each denominational system of tokens, and driving means for said registers, said driving means being controlled by said clutch means.

21. In combination a hopper for receiving in bulk tokens of different denominational systems, a rotary-carrying element for removing indifferently one by one the tokens from said hopper, rotary gaging means having positions corresponding to the different denominational systems of tokens, a pair of cam members, said members having cam surfaces corresponding to the positions on said gaging means, a pair of finding fingers one for each denominational system of tokens, and a pair of registers controlled by said cam means for registering each denominational system of tokens.

22. In combination, a hopper for receiving in bulk tokens of different denominational systems, said tokens including a plurality of denominations of coins, a rotary-carrying element for removing indifferently one by one the tokens from said hopper, rotary gaging means having positions for each denomination of coin and for the other tokens, a cam member for the coin to be registered, a cam member for the other tokens, said members having cam surfaces corresponding to the tokens to be registered, a register for registering the coins and a register for registering the other tokens, said registers being controlled by said cam members.

23. In combination, a hopper for receiving in bulk tokens of different denominational systems, said tokens including coins of different denominations, a rotary-carrying element for removing indifferently one by one the tokens from said hopper, rotary gaging means having positions corresponding to the different denominational systems of tokens, a cam member having cam surfaces corresponding to the different denominations of coins to be registered, a cam member having a cam surface corresponding to the other tokens to be registered, a finding finger for engaging each of the coins as they appear in said gaging means, a finding finger for engaging the other tokens, said finding fingers being controlled by said cam members, a register for registering the coins engaged by said first finding finger, and another register for registering the tokens engaged by said second finding finger.

24. In combination, a hopper for receiving in bulk tokens of different denominational systems, said tokens including coins of different denominations, a rotary-carrying element for removing indiscriminately one by one the tokens from said hopper, rotary-identifying means having positions for the different denominations of coins and for the other tokens, cam means having cam surfaces corresponding to the positions on said identifying means, a finding finger controlled by said cam means for engaging the coins passing through said identifying means, a second finding finger also controlled by said cam means for engaging the other tokens passing through said identifying means, a register for registering coins, another register for registering the other tokens, and a clutch mechanism controlled by said finding fingers for registering the coins and other tokens passing through said identifying means.

25. In combination, a movable token gaging means having identifying positions for tokens of different denominational systems, cam means operated in unison with said gaging means, a pair of pivoted finding fingers for engaging tokens and means controlled by said cam means for imparting an individual motion to each finding finger.

26. A rotary gaging means having a plurality of token identifying positions for identifying tokens of different denominational systems, a pair of cam members geared to said gaging means, a pair of finding fingers controlled by said cam members for engaging the tokens, each finger being given an appropriate motion to engage the tokens of a given system, and a register for each denominational system of token, the operation of said registers being controlled by said finding fingers.

27. In combination, a driving shaft, rotary gaging means for gaging tokens of different denominational systems, a pair of overhead registers, shafts to said registers for operating the same, a pair of rotary cams having cam surfaces corresponding to the positions of said gaging means and means controlled by said cams and by the tokens in the corresponding positions for connecting said driving shaft and said register operating shafts to actuate the register in accordance with the tokens passing through said gaging means.

28. In combination, a driving shaft, rotary gaging means for gaging tokens of different denominational systems, a pair of overhead registers, shafts to said registers for operating the same, a pair of rotary cams having cam surfaces corresponding to the positions of said gaging means, and clutch mechanism controlled by said cams for connecting said driving shaft and said register operating shafts to register the tokens passing through said gaging means.

29. In combination a driving shaft, rotary gaging means for gaging tokens of different denominational systems, a pair of overhead registers, shafts to said registers for operating the same, a pair of rotary cams having cam surfaces corresponding to the positions of said gaging means, finding fingers controlled by said cams for engaging said tokens and clutch mechanism controlled by said finding fingers for connecting said driving shaft and said register operating shafts to actuate the register in accordance with the tokens passing through said gaging means.

30. In combination, a pair of registers for registering tokens of different denominational systems, a hopper for receiving said tokens in bulk, automatic means for registering tokens of said different systems upon the register corresponding to the denominational system, means for resetting said registers and interlocking means for preventing the registration of tokens during the resetting operation.

31. In combination, a pair of registers for registering tokens of different denominational systems, a hopper for receiving tokens in bulk, automatic means for registering tokens of said different systems upon the register corresponding to the denominational system, and common means for resetting said registers.

32. In combination, a pair of registers for registering tokens of different denominational systems, a hopper for receiving tokens in bulk, automatic means for registering the different denominations of tokens upon said registers, means for resetting said registers and interlocking means preventing resetting of said registers during the registration of tokens.

33. In combination, a pair of registers for registering tokens of different denominational systems, a hopper for receiving tokens in bulk, means for automatically gaging and registering the different denominations of tokens upon said registers, an independent fare register, common means for resetting said registers, and interlocking means preventing registration upon any of said registers during the resetting thereof.

34. In combination, a pair of overhead registers for registering tokens of different denominational systems, an independent fare register, a hopper for receiving tokens in bulk, means for automatically gaging and registering the different denominations of tokens upon said registers, common means for resetting said registers, and interlocking means preventing the resetting of said registers during the registration of tokens or the operation of said transfer register.

35. In combination, a pair of overhead registers, a casing, a pair of columns for supporting said registers from said casing, token receiving means on said casing for receiving tokens of two denominational systems, automotic means within said casing for registering one system of tokens upon one of said registers and means also within said casing for registering the other class of tokens upon the other of said registers, driving shafts extending through said columns for actuating said registers, means for resetting said registers and interlocking means in said casing for mutually interlocking the automatic means and the registers, said interlocking means extending through one of said columns.

36. In combination, a measuring chamber having a passage of successively decreasing width, the beginning of each decrease constituting a position, cam means, a pair of finding fingers, one of said fingers being moved by said cam means to test for the presence of a token at predetermined ones of said positions, and the other of said fingers being moved by said cam means to test for the presence of tokens at the remainder of said positions.

37. In combination a rotating coin carrying element having individual positions for tokens of different denominational systems, cam means, a pair of finding fingers, one of said fingers being moved by said cam means to test for the presence of a token of one system at predetermined positions of said rotating carrying element, and the other of said fingers being moved by said cam means to test for the presence of tokens of a different system at others of said positions of said rotating carrying element.

38. In combination, a vertical shaft, a pair of cams secured to said shaft, a pair of planetary gears revolving about said shaft, a pair of overhead registers for registering a plurality of tokens of different denominational systems, register actuating means adapted to be driven by said planetary gears, a rotary token carrying element having positions individual to the denominations of each system of coins to be registered, a pair of finding fingers, one of said fingers being moved by one of said cams to test for the presence of a token at predetermined positions, and the other of said fingers being moved by the other of said cams to test for the presence of tokens at others of said positions, and clutch means controlled by each finding finger, said clutch means being operated upon contact of the corresponding finding fingers with a token to cause the planetary gear to transmit the proper registering motion to the corresponding overhead register.

39. In combination, an overhead register, a vertical register shaft, a stud parallel to said register shaft, a Geneva wheel on said vertical shaft, a Geneva cam on said stud, said cam comprising a horizontal plate, a pawl on said plate, a pin on said plate parallel to said stud, an actuating arm for said register shaft, said arm swinging in a vertical plane, a pin on said arm, said pin being at right angles to said first pin, and a link closely fitting over both of said pins.

40. In combination, a register, a Geneva wheel, a Geneva cam comprising a pivoted ratchet bearing plate, a rocking arm pivoted to swing in a plane at an angle to said plate, a pin on said plate and a pin on said arm and a block having cylindrical holes at an angle to each other for receiving said pins, and holding the same out of contact.

41. In combination, a register, a Geneva wheel, a Geneva cam comprising a pivoted ratchet plate, a rocking arm pivoted to swing in a plane at right angles to said plate, a pin on said plate and a pin on said arm, a block having cylindrical holes at an angle to each other for receiving said pins, means for resetting said register and a swinging interlocking lever for engaging a shoulder on said ratchet bearing plate to prevent actuation of the same, said lever being connected to said resetting means.

42. In combination, a register, a Geneva wheel for operating said register, a Geneva cam comprising a pivoted ratchet bearing plate, a rocking arm pivoted to swing in a plane at right angles to said plate, a pin on said plate and a pin on said arm, a block having cylindrical holes at right angles for receiving said pins, a token register, token controlled means for actuating said register, means for resetting both of said registers simultaneously and means for interlocking said ratchet bearing plate with said resetting means.

43. In combination, a register, a Geneva stop motion comprising a ratchet plate for actuating said register, manual means comprising an arm swinging at right angles to said plate to operate said ratchet plate, resetting means for said register, said means requiring a preliminary unlocking movement, and a pivoted lever connected to said resetting means, said ratchet plate having an arcute portion and a notched portion, said notched portion being presented toward the end of said lever when the same is moved to allow of resetting, said arcuate portion being presented to the end of said lever when said plate is in actuated or off normal position to prevent resetting.

44. In combination, a register, a Geneva stop motion comprising a ratchet plate for actuating said register, manual means to operate said ratchet plate, a token register, token controlled means for actuating said register, common means for resetting both of said registers simultaneously, said means requiring a preliminary unlocking movement and a pivoted lever connected to said resetting means, said ratchet plate having an arcuate portion and a notched portion, said notched portion being presented toward the end of said lever when the same is moved to allow of resetting, said circular portion being presented to the end of said lever when said plate is inactuated or off normal position to prevent resetting.

45. In combination, a token register for registering one denominational system of tokens, another token register for registering a different denominational system of token, a token receiver, token controlled means for automatically actuating said registers in accordance with the tokens passed to said receiver, an independent transfer register, manual means for actuating said transfer register, common resetting means for all of said registers, and interlocking means for preventing actuation of the actuating means of all the registers during resetting of said registers.

46. In combination, a token receiving hopper, token gaging means, a plurality of registers, each register comprising a totalizing register and a trip register, automatic means for registering tokens of one denomination upon one register, means for registering tokens of a different denomination upon another register, and common resetting means for resetting said trip registers.

47. In combination, a token receiving hopper, token gaging means, a plurality of registers, said registers comprising totalizing registers and trip or temporary registers, automatic means for registering tokens of one denominational system upon one register and automatic means for registering tokens of a different denominational system upon another register, and common resetting means for resetting the trip or temporary registers.

48. In combination, a token receiving hopper, token gaging means and a plurality of registers, each of said registers comprising accumulating register wheels and trip or temporary register wheels, manual means for operating one of said registers to register transfers, automatic means controlled by said gaging means for registering tokens which are even multiples of a given value upon one register, automatic means for registering tokens which are fractional multiples of said value upon another register, and common resetting means for resetting said trip or temporary register wheels.

49. In a device for sorting and registering tokens, a rotatable carrying element for the tokens, token identifying or gaging means, said gaging means moving all of said tokens through the same predetermined path, a plurality of registers, a plurality of mechanisms to operate the same, one for engaging each kind of token, and cam means controlling the proper mechanisms to cause registration of the respective token.

50. In a device for sorting and registering tokens, a receiving hopper for receiving different kinds of tokens, a rotatable carrying element for the tokens, means for moving all of said tokens past a pre-determined gaging point, a plurality of registers, a plurality of mechanisms to operate the same, one mechanism for engaging each kind of token, and cam means controlling the proper mechanism to cause registration of the respective token.

51. In combination a member pivoted to oscillate in a given plane, another member pivoted to oscillate in a plane substantially at right angles to said first plane, a pin secured to said first member, said pin being substantially perpendicular to said first plane, a pin on said second member, said second pin being substantially perpendicular to said second plane and a connecting block or link having holes therethrough for receiving said pin, said holes having their axes lying on different parallel plane.

52. In combination, a member pivoted to oscillate in a given plane, an arm pivoted to oscillate in a plane substantially at right angles to said first plane, a pin secured to said member, said pin being substantially perpendicular to said first plane, a pin secured to said arm, said pin being substantially perpendicular to said second plane, a connecting block or link having holes therethrough for receiving said pin, said holes being non-communicating and substantially at right angles to each other, manual means for operating said arm and a register operated by said member.

53. In combination, a member pivoted to oscillate in a given plane, another member pivoted to oscillate in a plane at substantially right angles to said first plane, a pin secured to said first member, said pin being substantially parallel to said second plane, a pin secured to said second member, said second pin being substantially parallel to said first plane, a connecting block or link having holes therein for receiving said pins, said holes lying at an angle to each other but being non-communicating.

54. In combination, a member pivoted to oscillate in a given plane, another member pivoted to oscillate in a plane at an angle to said first plane, a pin secured to said first member, said pin being substantially perpendicular to said first plane, a pin secured to said second member, said pin being substantially vertical to said second plane, and a connecting block or link having holes therein for receiving said pins, said holes lying at an angle to each other and being non-communicating.

55. In combination, a token-receiving hopper for receiving tokens of different denominational systems, token-gaging means, a plurality of registers, and automatic means coöperating with said gaging means for registering tokens which are multiples of a given value upon one register and automatic means coöperating with said gaging means for registering tokens which are not multiples of said value upon another register, said registers comprising each totalizing register wheels and trip register wheels, resetting mechanism for the trip register wheels, and direction indicating mechanism controlled by said resetting mechanism.

56. In combination, a token receiving hopper for receiving tokens of different denominational systems, a token carrying element; token gaging means, a plurality of registers, one of said registers comprising totalizing register wheels, trip register wheels, resetting means for said trip register wheels, and direction indicating mechanism operated by said resetting mechanism, automatic means coöperating with said gaging means, for registering tokens which are multiples of a given value upon one register, and automatic means coöperating with said gaging means for registering tokens which are not multiples of said value upon another register.

57. In combination, a token receiving hopper, a token carrying element, token gaging means, a plurality of registers, automatic means coöperating with said gaging means, for registering tokens which are multiples of a given value upon one register, automatic means coöperating with said gaging means, for registering tokens which are not multiples of said value upon another register, and distinctive audible signaling means operated by the registration of a token upon the corresponding register.

58. In combination, a token receiving hopper, token gaging means, a plurality of registers, automatic means coöperating with said gaging means, for registering tokens of one denomination upon one register, means for registering tokens of a different denomination upon another register, gongs for said registers, said gongs having distinctive sounds, and means for striking the corresponding gong when a token is registered upon the corresponding register.

In witness whereof, I hereunto subscribe my name this 16th day of December A. D. 1915.

ARTHUR H. WOODWARD.